(12) United States Patent
Oshima et al.

(10) Patent No.: US 10,104,278 B2
(45) Date of Patent: Oct. 16, 2018

(54) PAN AND TILT OPERATION DEVICE, CAMERA SYSTEM WITH POSTURE SENSOR, PAN AND TILT OPERATION PROGRAM, AND PAN AND TILT OPERATION METHOD

(71) Applicant: FUJIFILM Corporation, Tokyo (JP)

(72) Inventors: Hiroyuki Oshima, Saitama (JP); Mikio Watanabe, Saitama (JP); Takeshi Misawa, Saitama (JP); Masaya Tamaru, Saitama (JP); Daisuke Hayashi, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/423,832

(22) Filed: Feb. 3, 2017

(65) Prior Publication Data

US 2017/0150031 A1  May 25, 2017

Related U.S. Application Data

(63) Continuation of application No. PCT/JP2015/067869, filed on Jun. 22, 2015.

(30) Foreign Application Priority Data

Sep. 5, 2014  (JP) ................. 2014-181034

(51) Int. Cl.
*H04N 5/232*     (2006.01)
*H04N 5/77*      (2006.01)
(Continued)

(52) U.S. Cl.
CPC ..... *H04N 5/23203* (2013.01); *H04N 5/23216* (2013.01); *H04N 5/23293* (2013.01);
(Continued)

(58) Field of Classification Search
CPC .. H04N 5/23203; H04N 5/23206; H04N 5/77; H04N 5/23216; H04N 5/23293; G06F 3/0488; G06F 3/04817
See application file for complete search history.

(56) References Cited

U.S. PATENT DOCUMENTS 8,838,276 B1 * 9/2014 Desai ................. H04N 5/23206
                                                  348/207.11
2002/0191080 A1 * 12/2002 Terada ................. H04N 5/2259
                                                  348/207.1
(Continued)

FOREIGN PATENT DOCUMENTS

JP  2000-209575 A    7/2000
JP  2006-145761 A    6/2006
(Continued)

OTHER PUBLICATIONS

International Search Report, issued in PCT/JP2015/067869, dated Aug. 11, 2015.
(Continued)

*Primary Examiner* — Twyler Haskins
*Assistant Examiner* — Akshay Trehan
(74) *Attorney, Agent, or Firm* — Birch, Stewart, Kolasch & Birch, LLP

(57) ABSTRACT

In an aspect of the present invention, assignment and a rotation direction of a pan motor and a tilt motor of each key of a cross key are set on the basis of the installation posture of the camera. Accordingly, it is possible to operate the cross key without discomfort when the camera is caused to perform a pan operation or a tilt operation using the cross key. Further, if the camera is caused to perform the pan operation using the cross key and a specific condition under which a video rotates is discriminated from a tilt angle, a display of a corresponding icon of the cross key is switched from a first icon indicating an up and down direction or a left (Continued)

and right direction to a second icon indicating a rotation direction. Accordingly, it is possible not to cause discomfort even when a video rotates.

6 Claims, 14 Drawing Sheets

(51) Int. Cl.
H04N 5/262 (2006.01)
G06F 3/0481 (2013.01)
G06F 3/0488 (2013.01)

(52) U.S. Cl.
CPC ............ H04N 5/2628 (2013.01); H04N 5/77 (2013.01); *G06F 3/0488* (2013.01); *G06F 3/04817* (2013.01)

(56) References Cited

U.S. PATENT DOCUMENTS

| | | | |
|---|---|---|---|
| 2007/0109417 A1* | 5/2007 | Hyttfors | H04N 5/232 348/211.99 |
| 2009/0041378 A1* | 2/2009 | Yamaoka | G06T 5/006 382/275 |
| 2011/0085016 A1* | 4/2011 | Kristiansen | G06F 3/04883 348/14.03 |
| 2012/0007999 A1* | 1/2012 | Horii | H04N 5/232 348/211.4 |
| 2012/0057037 A1 | 3/2012 | Ono | |
| 2012/0307052 A1* | 12/2012 | Thiruvengada | H04N 7/183 348/143 |

FOREIGN PATENT DOCUMENTS

JP 2012-23434 A 2/2012
JP 2012-60215 A 3/2012

OTHER PUBLICATIONS

Written Opinion of the International Searching Authority, issued in PCT/JP2015/067869, dated Aug. 11, 2015.

\* cited by examiner

[POSTURE A]

[VIDEO]

[POSTURE B]

[VIDEO]

[POSTURE C]

[VIDEO]

FIG. 9

| CROSS KEY | POSTURE A | | POSTURE B | | POSTURE C | |
|---|---|---|---|---|---|---|
| | DISPLAY FORM | MOTOR CONTROL ASSIGNMENT | DISPLAY FORM | MOTOR CONTROL ASSIGNMENT | DISPLAY FORM | MOTOR CONTROL ASSIGNMENT |
| UP KEY | ← | TILT (CW) | ← | TILT (CCW) | ← | TILT (CW) |
| DOWN KEY | → | TILT (CCW) | → | TILT (CW) | → | TILT (CCW) |
| LEFT KEY | ↓ | PAN (CCW) | ↓ | PAN (CW) | ↻ | PAN (CCW) |
| RIGHT KEY | ↑ | PAN (CW) | ↑ | PAN (CCW) | ↺ | PAN (CW) |

FIG. 10A1
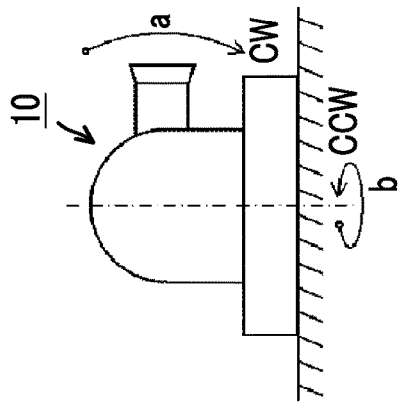
FIG. 10A2
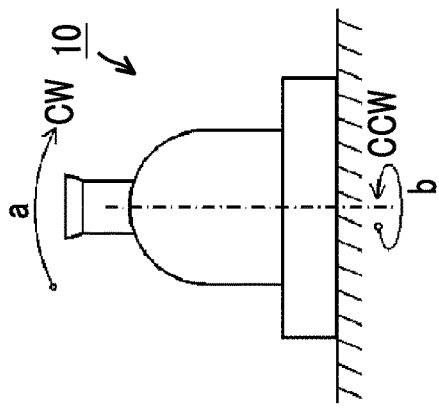
FIG. 10A3
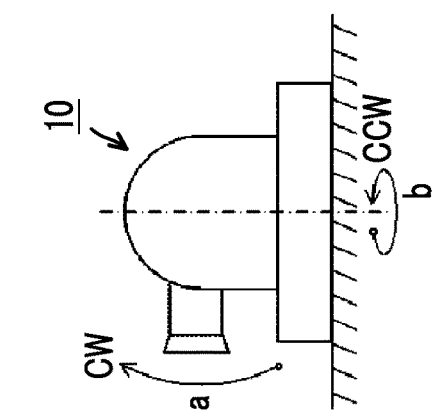
FIG. 10B1
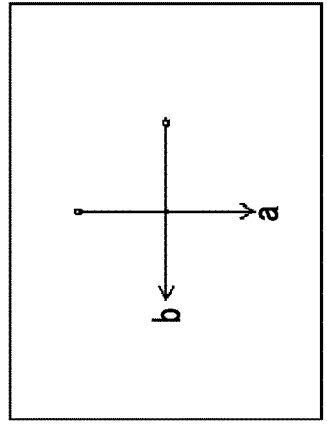
FIG. 10B2
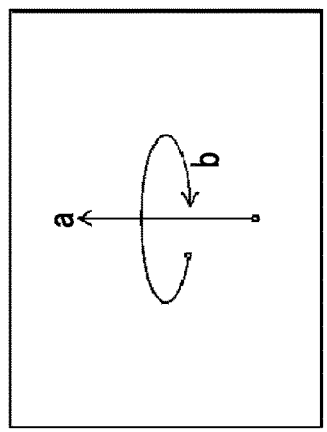
FIG. 10B3
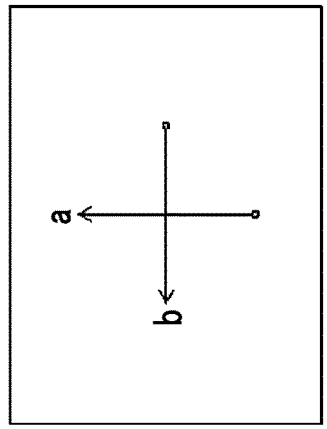

FIG. 11

| TILT ANGLE | POSTURE A | | | | | | | |
|---|---|---|---|---|---|---|---|---|
| | −30°~60° | | 60°~90° | | 90°~120° | | 120°~180° | |
| CROSS KEY | DISPLAY FORM | MOTOR CONTROL ASSIGNMENT | DISPLAY FORM | MOTOR CONTROL ASSIGNMENT | DISPLAY FORM | MOTOR CONTROL ASSIGNMENT | DISPLAY FORM | MOTOR CONTROL ASSIGNMENT |
| UP KEY | ↑ | TILT (CW) | ← | TILT (CW) | ← | TILT (CCW) | ← | TILT (CCW) |
| DOWN KEY | ↓ | TILT (CCW) | → | TILT (CCW) | → | TILT (CW) | → | TILT (CW) |
| LEFT KEY | ← | PAN (CCW) | ↻ | PAN (CCW) | ↻ | PAN (CCW) | ↓ | PAN (CCW) |
| RIGHT KEY | → | PAN (CW) | ↺ | PAN (CW) | ↺ | PAN (CW) | ↑ | PAN (CW) |

[POSTURE C]

[VIDEO]

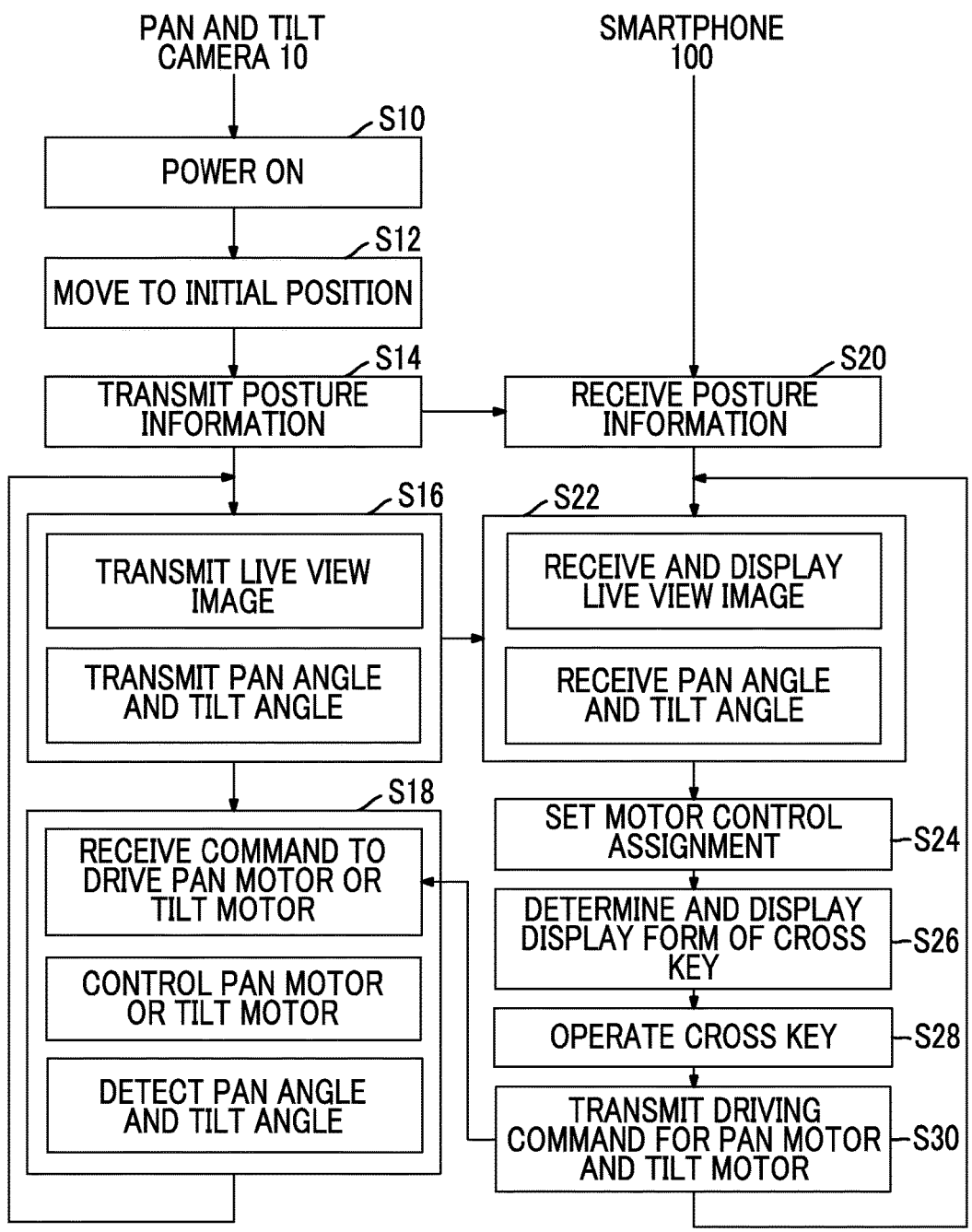

PAN AND TILT OPERATION DEVICE, CAMERA SYSTEM WITH POSTURE SENSOR, PAN AND TILT OPERATION PROGRAM, AND PAN AND TILT OPERATION METHOD

CROSS-REFERENCE TO RELATED APPLICATIONS

This application is a Continuation of PCT International Application No. PCT/JP2015/067869 filed on Jun. 22, 2015, which claims priority under 35 U.S.C. § 119(a) to Japanese Patent Application No. 2014-181034 filed on Sep. 5, 2014. Each of the above applications is hereby expressly incorporated by reference, in their entirety, into the present application.

BACKGROUND OF THE INVENTION

1. Field of the Invention

The present invention relates to a pan and tilt operation device, a camera system, a pan and a tilt operation program, and a pan and tilt operation method, and particularly, to a technology for remotely operating a camera comprising a pan and tilt mechanism.

2. Description of the Related Art

Conventionally, a pan and tilt camera system that remotely operates a pan and tilt camera using a pan and tilt device is known (JP2000-209575A).

The pan and tilt camera system described in JP2000-209575A includes a pan and tilt camera including a camera unit that outputs a video signal and a pan and tilt mechanism that changes an imaging direction of a camera according to an input direction control signal, and a pan and tilt operation device including direction operation means for designating a movement direction of the pan and tilt camera and a control unit that controls a direction control signal according to an operation of the direction operation means, and comprises discrimination means for detecting a top and bottom of an installation posture of the pan and tilt camera and discriminating whether the top and bottom is the same as a predetermined top and bottom posture. The control unit maintains up, down, left, and right movement directions of the direction control signal to be up, down, left, and right directions as they are or inverts up and down directions and left and right directions according to a result of the discrimination of the discrimination means and outputs the resultant direction control signal to the pan and tilt mechanism.

Thus, the up, down, left, and right movement direction of the pan and tilt camera designated by the direction operation means is caused to match up, down, left, and right movement directions of the actually moving pan and tilt camera regardless of the installation posture of the top and bottom of the pan and tilt camera to achieve improved operability.

Further, JP2006-145761A describes a camera that detects a posture of a camera body and changes assignment of an up key, a down key, a left key, and a right key of a cross key provided on a rear surface of the camera body according to the detected posture of the camera body when the camera performs horizontal imaging or vertical imaging that is performed while holding the camera body in a normal direction or in a direction substantially perpendicular to the normal direction. Specifically, the left and right keys are assigned as zoom keys at the time of horizontal imaging, and the up and down keys are assigned as the zoom keys at the time of vertical imaging.

SUMMARY OF THE INVENTION

In the pan and tilt camera system described in JP2000-209575A, up, down, left, and right movement directions of the pan and tilt camera designated by the direction operation means is caused to match up, down, left, and right movement directions of the actually moving pan and tilt camera regardless of the installation posture of the top and bottom of the pan and tilt camera to achieve improved operability. However, in a case where the pan and tilt mechanism of the pan and tilt camera satisfies a specific condition (for example, in a case where an imaging optical axis direction of the camera unit substantially matches a central axis of rotation of a pan mechanism of the pan and tilt mechanism), there is a problem in that even when a direction control signal for a left and right movement direction (pan direction) is output to the pan and tilt mechanism, a video to be captured rotates (rolls) instead of moving in a left and right direction, and an operator remotely operating the pan and tilt camera feels discomfort between a pan and tilt operation instruction and the obtained video.

Further, in JP2006-145761A, the camera in which functions of the respective up, down, left and right keys of the cross key provided on the rear surface of the camera body can be changed between the time of horizontal imaging and the time of vertical imaging has been described, but this camera is a camera which is grasped by the hand, but is not a pan and tilt camera that is installed in a specific position and direction.

The present invention has been made in view of these circumstances, and an object thereof is to provide a pan and tilt operation device, a camera system, a pan and tilt operation program, and a pan and tilt operation method capable of remotely operating a camera without discomfort regardless of an installation posture of the camera.

In order to achieve the above object, an aspect of the present invention provides pan and tilt operation device that is wirelessly or wiredly connected to a camera, the camera including an imaging unit including an imaging lens and an imaging element, and a pan and tilt mechanism that rotates the imaging unit in a horizontal direction and a vertical direction with respect to a camera body, and remotely operates the camera, the pan and tilt operation device comprising: a posture information acquisition unit that acquires posture information indicating an installation posture of the camera; a touch panel including a display panel, and an operation panel that detects touched coordinates on the display panel; a display control unit that displays a cross key including icons indicating an up key, a down key, a left key, and a right key on the display panel; a key operation detection unit that detects whether any of the up key, the down key, the left key, and the right key of the cross key is touched on the basis of the coordinates detected by the operation panel; a motor control assignment setting unit that sets motor control assignment indicating a correspondence relationship between the touch operation of the up key, the down key, the left key, or the right key of the cross key detected by the key operation detection unit and assignment of the pan motor or the tilt motor that drives the pan and tilt mechanism and a motor rotation direction on the basis of the posture information acquired by the posture information acquisition unit; and a motor driving command output unit that outputs a motor driving command corresponding to the detected key to the camera when the touch operation of the up key, the down key, the left key, or the right key of the cross key is detected by the key operation detection unit, the motor driving command output unit outputting the motor driving command obtained by selecting the pan motor or the tilt motor according to the motor control assignment set by the motor control assignment setting unit and specifying the rotation direction of the selected motor, in which the display control unit discriminates a specific condition under which a video captured by the camera rotates when the pan motor is driven, on the basis of a tilt angle of the pan and tilt mechanism, and switches the corresponding icon among the icons indicating the up key, the down key, the left key, and the right key of the cross key displayed on the display panel from a first icon indicating an up and down direction or a left and right direction to a second icon indicating a rotation direction when the specific condition is discriminated.

According to the aspect of the present invention, since the assignment and the rotation direction of the pan motor and the tilt motor of each key of the cross key are set on the basis of the installation posture of the camera, it is possible to operate the cross key without discomfort when the camera is caused to perform the pan operation or the tilt operation using the cross key. Further, if the camera is caused to perform the pan operation using the cross key and the specific condition under which the video rotates is discriminated from the tilt angle, since the display of the corresponding icon of the cross key is switched from the first icon indicating the up and down direction or the left and right direction to the second icon indicating the rotation direction, it is possible not to cause discomfort even when the video rotates.

In pan and tilt operation device according to another aspect of the present invention, it is preferable that the pan and tilt operation device further comprises an image acquisition unit that acquires a live view image captured by the camera from the camera, and the display control unit displays the live view image acquired by the image acquisition unit on the display panel. Accordingly, it is possible to operate the camera while viewing the live view image.

In pan and tilt operation device according to still another aspect of the present invention, it is preferable that the posture information acquisition unit acquires posture information indicating an installation posture of the camera from an installation posture input unit in which the installation posture is set, through wireless or wired communication from the camera or a manual operation.

In pan and tilt operation device according to still another aspect of the present invention, it is preferable that the pan and tilt operation device further comprises an angle acquisition unit that acquires a pan angle and a tilt angle of the pan and tilt mechanism from the camera, and the motor control assignment setting unit sets the motor control assignment on the basis of the posture information acquired by the posture information acquisition unit and the pan angle and the tilt angle acquired by the angle acquisition unit. This is because it is necessary to change the motor control assignment for the operation of the cross key according to the pan angle or the tilt angle of the pan and tilt mechanism.

In pan and tilt operation device according to still another aspect of the present invention, it is preferable that the posture information indicating the installation posture of the camera is information indicating any of a posture when the camera is installed on an upper surface of a horizontal plane, a posture when the camera is installed on a lower surface of the horizontal plane, and a posture when the camera is installed in a vertical plane.

In pan and tilt operation device according to still another aspect of the present invention, it is preferable that the pan and tilt operation device further comprises an angle acquisition unit that acquires a pan angle and a tilt angle of the pan and tilt mechanism from the camera, and the display control unit graphically displays the pan angle and the tilt angle acquired by the angle acquisition unit on the display panel. Thus, it is possible to confirm how much the pan and tilt mechanism can be moved in a certain direction, and this can be used as a reference when the cross key is operated.

In pan and tilt operation device according to still another aspect of the present invention, it is preferable that the display control unit changes a form of the graphical display according to whether a specific condition under which a video captured by the camera rotates is satisfied. Accordingly, it is possible to confirm whether a video moves in the pan direction or rotates from a change in a form of a graphic display for displaying the pan angle and the tilt angle, as well as the switching of the display form of the icon indicating the cross key.

Still another aspect of the present invention provides a camera system including a camera and a pan and tilt operation device that is wirelessly or wiredly connected to the camera and remotely operates the camera, in which the camera comprises an imaging unit including an imaging lens and an imaging element, a pan and tilt mechanism that rotates the imaging unit in a horizontal direction and a vertical direction with respect to a camera body, a pan driving unit and a tilt driving unit that drives the pan and tilt mechanism using a pan motor and a tilt motor, an angle detection unit that detects each of a pan angle and a tilt angle of the pan and tilt mechanism, a motor driving command input unit that receives a motor driving command for the pan motor and the tilt motor from the pan and tilt operation device, and a pan and tilt control unit that controls the pan and tilt mechanism via the pan driving unit and the tilt driving unit on the basis of the motor driving command input from the motor driving command input unit, the pan and tilt operation device comprises a posture information acquisition unit that acquires posture information indicating an installation posture of the camera, an angle acquisition unit that acquires angle information indicating a pan angle and a tilt angle of the camera, a touch panel including a display panel, and an operation panel that detects touched coordinates on the display panel, a display control unit that displays a cross key including icons indicating an up key, a down key, a left key, and a right key on the display panel, a key operation detection unit that detects whether any of the up key, the down key, the left key, and the right key of the cross key is touched on the basis of the coordinates detected by the operation panel, a motor control assignment setting unit that sets motor control assignment indicating a correspondence relationship between the touch operation of the up key, the down key, the left key, or the right key of the cross key detected by the key operation detection unit and assignment of the pan motor or the tilt motor that drives the pan and tilt mechanism and a motor rotation direction on the basis of the posture information acquired by the posture information acquisition unit, and a motor driving command output unit that outputs a motor driving command corresponding to the detected key to the camera when the touch operation of the up key, the down key, the left key, or the right key of the cross key is detected by the key operation detection unit, the motor driving command output unit outputting the motor driving command obtained by selecting the pan motor or the tilt motor according to the motor control assignment set by the motor control assignment setting unit and specifying the rotation direction of the selected motor, and the display control unit discriminates a specific condition under which a video captured by the camera rotates when the pan motor is driven, on the basis of the tilt angle acquired by the angle acquisition unit, and switches the corresponding icon among the icons indicating the up key, the down key, the left key, and the right key of the cross key displayed on the display panel from a first icon indicating an up and down direction or a left and right direction to a second icon indicating a rotation direction when the specific condition is discriminated.

In a camera system according to still another aspect of the present invention, the camera includes a live view image output unit that outputs the live view image captured by the imaging unit to the pan and tilt operation device, the pan and tilt operation device includes an image acquisition unit that acquires the live view image captured by the camera from the camera, and the display control unit displays the live view image acquired by the image acquisition unit on the display panel.

In a camera system according to still another aspect of the present invention, the live view image output unit outputs a live view image in which the live view image is erect in a case where the installation posture of the camera is a reference installation posture, and the display control unit has a function of rotating and displaying the acquired live view image, and rotates the acquired live view image to erect the live view image to be displayed on the display panel in a case where the installation posture of the camera is different from the reference installation posture.

In a camera system according to still another aspect of the present invention, it is preferable that the camera includes a posture sensor that detects the installation posture of the camera; an angle detection unit that detects each of the pan angle and the tilt angle of the pan and tilt mechanism; and an information output unit that outputs posture information indicating the installation posture detected by the posture sensor and angle information indicating the pan angle and the tilt angle detected by the angle detection unit to the pan and tilt operation device, and the posture information acquisition unit and the angle acquisition unit acquire the posture information and the angle information from the information output unit, respectively.

In a camera system according to still another aspect of the present invention, it is preferable that the pan and tilt operation device comprises an installation posture input unit in which the installation posture is set by a manual operation, and the posture information acquisition unit acquires posture information indicating the installation posture of the camera from the installation posture input unit.

In a camera system according to still another aspect of the present invention, it is preferable for the motor control assignment setting unit to set the motor control assignment on the basis of the posture information, and the pan angle and the tilt angle respectively acquired by the posture information acquisition unit and the angle acquisition unit.

In a camera system according to still another aspect of the present invention, it is preferable that at least one of the camera and the pan and tilt operation device comprises a recording unit that records the image captured by the imaging unit.

Still another aspect of the present invention provides a pan and tilt operation program that causes a portable terminal including a wireless communication unit, a touch panel including a display panel and an operation panel that detects touched coordinates on the display panel, and a computer to function as a pan and tilt operation device that remotely operates a camera including an imaging unit including an imaging lens and an imaging element, and a pan and tilt mechanism that rotates the imaging unit in a horizontal direction and a vertical direction with respect to a camera body, the pan and tilt operation program causing the computer to realize: a function of acquiring posture information indicating an installation posture of the camera; a function of displaying a cross key including icons indicating an up key, a down key, a left key, and a right key on the display panel; a function of detecting whether any of the up key, the down key, the left key, and the right key of the cross key is touched on the basis of the coordinates detected by the operation panel; a function of setting motor control assignment indicating a correspondence relationship between the touch operation of the up key, the down key, the left key, or the right key of the cross key and assignment of the pan motor or the tilt motor that drives the pan and tilt mechanism and a motor rotation direction on the basis of the acquired posture information; and a function of outputting a motor driving command corresponding to the detected key to the camera when the touch operation of the up key, the down key, the left key, or the right key of the cross key is detected, the function including outputting the motor driving command obtained by selecting the pan motor or the tilt motor according to the set motor control assignment and specifying the rotation direction of the selected motor, in which the function of displaying a cross key includes discriminating a specific condition under which a video captured by the camera rotates when the pan motor is driven, on the basis of a tilt angle of the pan and tilt mechanism, and switching the corresponding icon among the icons indicating the up key, the down key, the left key, and the right key of the cross key displayed on the display panel from a first icon indicating an up and down direction or a left and right direction to a second icon indicating a rotation direction when the specific condition is discriminated.

By further installing the pan and tilt operation program according to the aspect of the present invention in an existing portable terminal such as a smartphone or a tablet terminal, it is possible to cause the existing portable terminal to function as the pan and tilt operation device that remotely operates the camera.

In the pan and tilt operation program according to still another aspect of the present invention, it is preferable that the pan and tilt operation program further causes the computer to realize a function of acquiring a live view image captured by the camera from the camera, and a function of displaying the acquired live view image on the display panel.

In the pan and tilt operation program according to still another aspect of the present invention, it is preferable that the pan and tilt operation program further causes the computer to realize a function of acquiring the pan angle and the tilt angle of the pan and tilt mechanism from the camera, and the function of setting the motor control assignment includes setting the motor control assignment on the basis of the acquired posture information, the pan angle, and the tilt angle. A computer-readable non-transitory recording medium having the program recorded thereon is also included in the aspect of the present invention.

Still another aspect of the present invention provides a pan and tilt operation method that includes wirelessly or wiredly connecting to a camera, the camera including an imaging unit including an imaging lens and an imaging element, and a pan and tilt mechanism that rotates the imaging unit in a horizontal direction and a vertical direction with respect to a camera body, and remotely operating the camera, the pan and tilt operation method comprising: a step of acquiring posture information indicating an installation posture of the camera; a step of displaying a cross key including icons indicating an up key, a down key, a left key, and a right key on a display panel of a touch panel including the display panel, and an operation panel that detects touched coordinates on the display panel; a step of detecting whether any of the up key, the down key, the left key, and the right key of the cross key displayed on the display panel is touched on the basis of the coordinates detected by the operation panel; a step of setting motor control assignment indicating a correspondence relationship between a touch operation of the up key, the down key, the left key, or the right key of the cross key and assignment of a pan motor or a tilt motor that drives the pan and tilt mechanism and a motor rotation direction on the basis of the acquired posture information; and a step of outputting a motor driving command corresponding to the detected key to the camera when the touch operation of the up key, the down key, the left key, or the right key of the cross key is detected, the step including outputting the motor driving command obtained by selecting the pan motor or the tilt motor according to the set motor control assignment and specifying the rotation direction of the selected motor, in which the step of displaying a cross key includes discriminating a specific condition under which a video captured by the camera rotates when the pan motor is driven, on the basis of a tilt angle of the pan and tilt mechanism, and switching the corresponding icon among the icons indicating the up key, the down key, the left key, and the right key of the cross key displayed on the display panel from a first icon indicating an up and down direction or a left and right direction to a second icon indicating a rotation direction when the specific condition is discriminated.

According to the present invention, it is possible to operate the cross key without discomfort when the camera is caused to perform the pan operation or the tilt operation using the cross key regardless of the installation posture of the camera. In particular, since the display of the corresponding icon of the cross key is switched to the icon indicating the rotation direction in the case of a specific condition under which the video rotates if the camera is caused to perform the pan operation using the cross key, it is possible not to cause discomfort even when the video rotates.

BRIEF DESCRIPTION OF THE DRAWINGS

FIG. 9 illustrates a table showing a relationship among an installation posture of a pan and tilt camera, a display form of icons indicating up, down, left, and right keys of a cross key, and motor control assignment of respective up, down, left and right keys of a cross key.

FIGS. 10A1 to 10B3 are diagrams illustrating that a movement direction (including rotation) of the angle of view for imaging is changed according to a range of a tilt angle of the pan and tilt mechanism when a pan and tilt camera is installed on an upper surface of the horizontal plane.

FIG. 11 illustrates a table illustrating a relationship among a range of a tilt angle when a pan and tilt camera is installed on an upper surface of the horizontal plane, a display form of icons indicating respective up, down, left, and right keys of a cross key, and motor control assignment of the respective up, down, left and right keys of the cross key.

FIG. 14 is a flowchart used to describe a pan and tilt operation method.

DESCRIPTION OF THE PREFERRED EMBODIMENTS

Hereinafter, embodiments of pan and tilt operation device, a pan and tilt camera system, a pan and tilt operation program, and a pan and tilt operation method according to the present invention will be described with reference to the accompanying drawings.

[Pan and Tilt Camera System]

Figure 1:
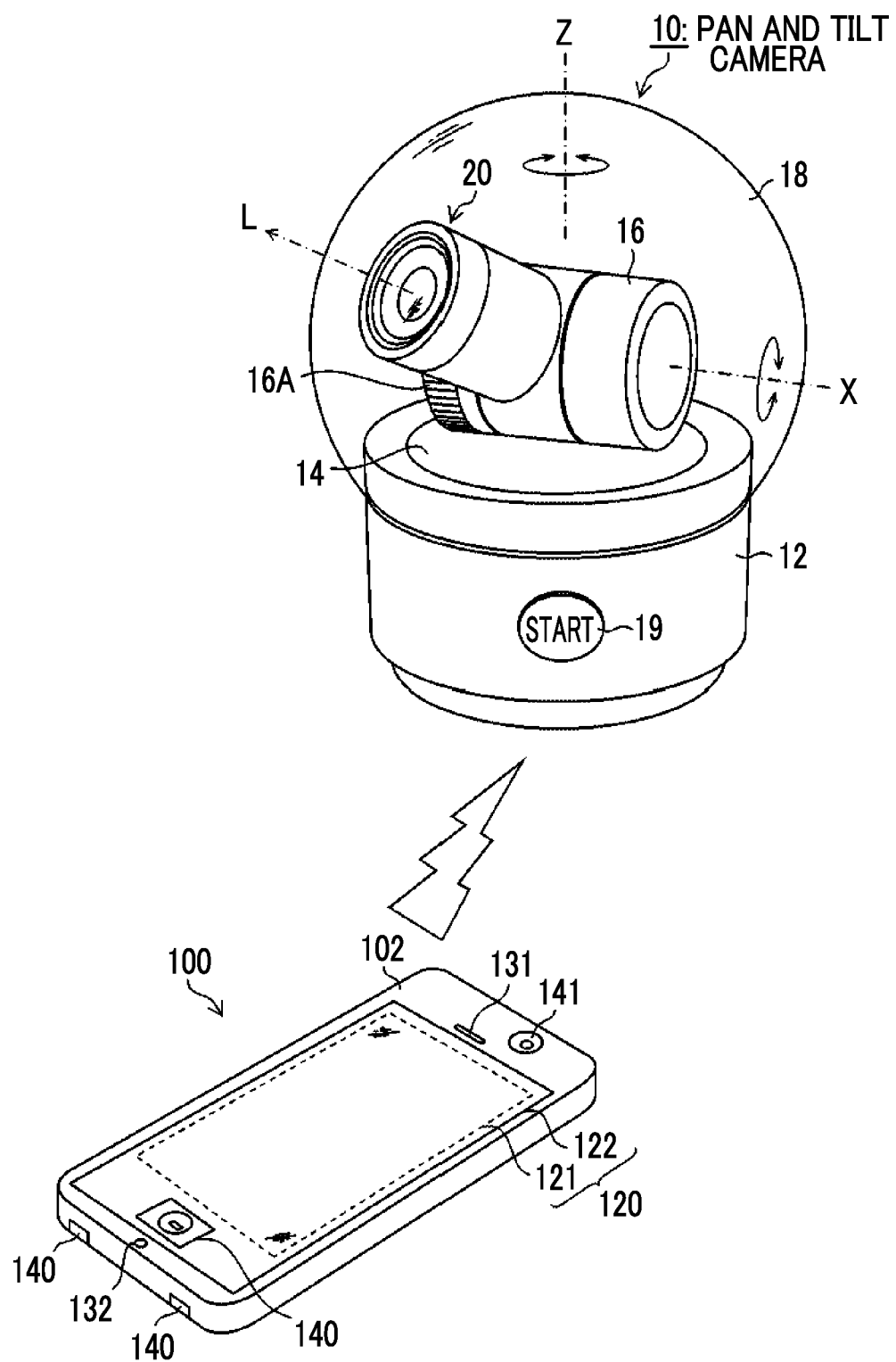
FIG. 1 is a perspective view illustrating an appearance of a pan and tilt camera system according to the present invention.

FIG. 1 is a perspective view illustrating an appearance of a pan and tilt camera system according to the present invention.

The pan and tilt camera system includes a pan and tilt camera 10, and a pan and tilt operation device 100 (a smartphone in this example) according to the present invention.

<Pan and Tilt Camera>

The pan and tilt camera 10 mainly includes a camera body 12, a pedestal 14, a holding portion 16 that is fixed to the pedestal 14 and rotatably holds an imaging unit 20, and a dome cover 18 that covers the imaging unit 20.

Figure 2:
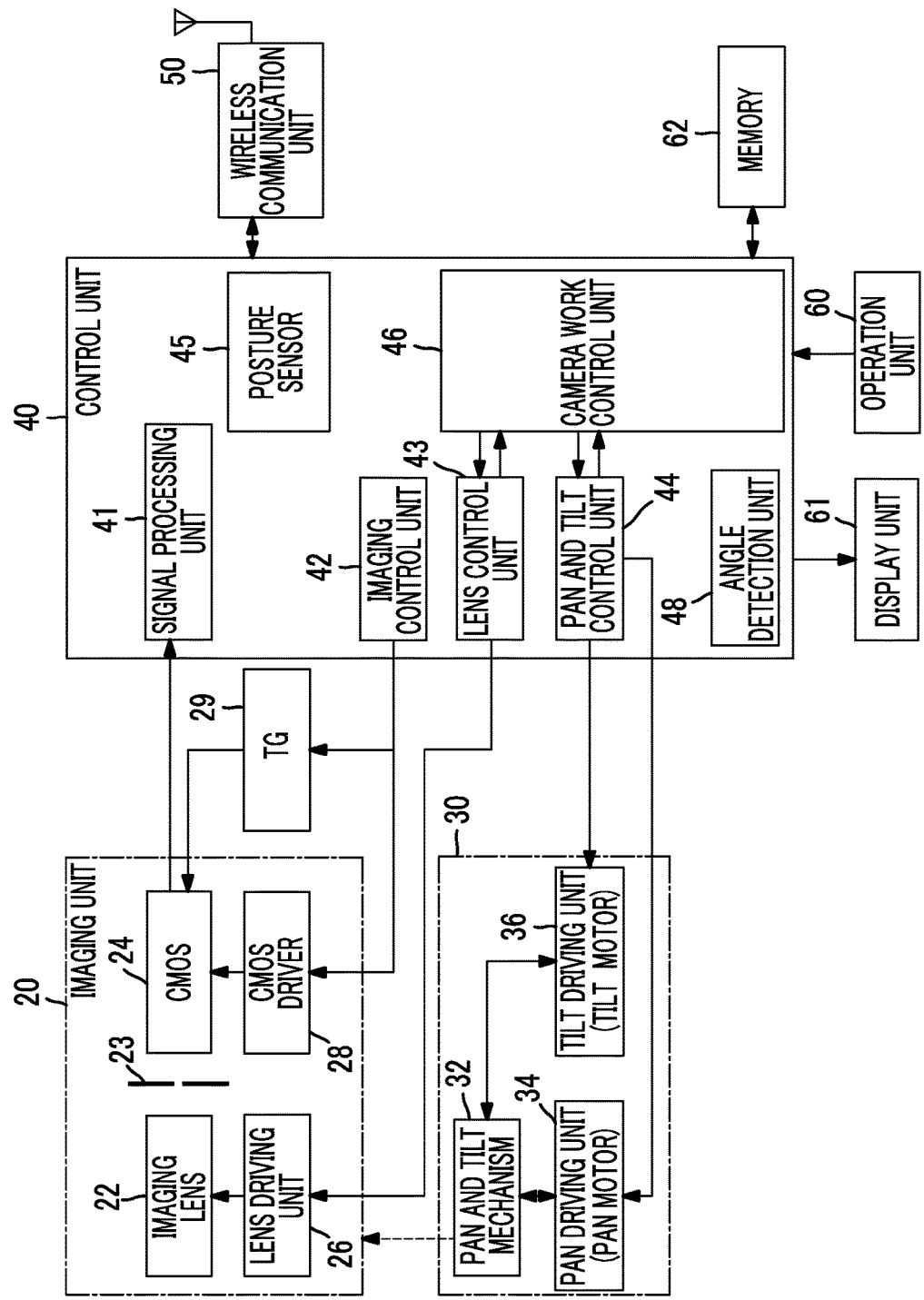
FIG. 2 is a block diagram illustrating an embodiment of an internal configuration of the pan and tilt camera.

The pedestal 14 is disposed to be rotatable about an axis in a vertical direction Z of the camera body 12, and is rotated about the axis in the vertical direction Z by a pan driving unit 34 (FIG. 2).

The holding portion 16 includes a gear 16A provided coaxially with an axis in a horizontal direction X, and rotates the imaging unit 20 in an up and down direction (a tilt operation) using a driving force transmitted from a tilt driving unit 36 (FIG. 2) through the gear 16A.

The dome cover 18 is a cover for dust-proof and drip-proof, and is preferably a spherical shell shape having a constant thickness, which has an intersection between an axis in the horizontal direction X and an axis in the vertical direction Z as a center of curvature so that optical performance of the imaging unit 20 does not change regardless of an optical axis direction L of the imaging unit 20.

Further, it is preferable for a tripod attachment portion (for example, tripod screw hole) (not illustrated) to be provided on a rear surface of the camera body 12.

An imaging start button 19 for instructing imaging start and a power switch (not illustrated) are provided in the pan and tilt camera 10, but the pan and tilt camera 10 includes a wireless communication unit 50 (FIG. 2) so that various operation instruction inputs are mainly added through wireless communication with an external portable terminal (a smartphone in this example) 100 from the smartphone 100.

FIG. 2 is a block diagram illustrating an embodiment of an internal configuration of the pan and tilt camera 10.

This pan and tilt camera 10 captures at least one of a still image and a moving image, and roughly includes the imaging unit 20, a pan and tilt device 30, a control unit 40, and the wireless communication unit 50.

The imaging unit 20 includes, for example, an imaging lens 22 and an imaging element 24. The imaging lens 22 includes a single focus lens or a zoom lens, and forms a subject image on an imaging surface of the imaging element 24. A focus lens, a variable magnification lens (in the case of a zoom lens), and a diaphragm 23 included in the imaging lens 22 is driven by a lens driving unit 26.

The imaging element 24 in this example is a color imaging device in which primary color filters of three primary colors including red (R), green (G), and blue (B) are arranged in each pixel in a predetermined pattern (for example, a Bayer array, G stripe R/G full checkered, an X-Trans (registered trademark) array, or a honeycomb array), and includes a complementary metal oxide semiconductor (CMOS) type image sensor. The imaging element 24 is not limited to the CMOS image sensor and may be a charge coupled device (CCD) type image sensor.

The imaging element 24 is driven by a CMOS driver 28 including, for example, a vertical driver and a horizontal driver, and a timing generator (TG) 29. From the imaging element 24, a pixel signal according to an incident light amount of subject light (a digital signal corresponding to signal charge accumulated in each pixel) is read.

The pan and tilt device 30 includes, for example, a pan mechanism that rotates the imaging unit 20 with respect to the camera body 12 in a horizontal direction (pan direction), and a tilt mechanism that rotates the imaging unit 20 in a vertical direction (tilt direction) (hereinafter referred to as a "pan and tilt mechanism") 32, a pan driving unit 34, and a tilt driving unit 36, as illustrated in FIG. 1. The pan and tilt mechanism 32 includes a home position sensor (for example, a proximity switch) that detects a reference position in the pan direction, and a home position sensor that detects a reference position in the tilt direction.

The pan driving unit 34 and the tilt driving unit 36 include a pan motor and a tilt motor including a stepping motor, and motor drivers that drive the motors, respectively, and outputs a driving force to the pan and tilt mechanism 32 to drive the pan and tilt mechanism 32.

The control unit 40 mainly includes a signal processing unit 41, an imaging control unit 42, a lens control unit 43, a pan and tilt control unit 44, and a camera work control unit 46.

The signal processing unit 41 performs signal processing such as offset processing, a gain control process including white balance correction and sensitivity correction, a gamma correction process, demosaic processing (demosaicing process), and RGB/YC conversion process on a digital image signal input from the imaging unit 20. Here, the demosaic processing is a process of calculating all of color information for each pixel from a mosaic image corresponding to a color filter array of a single plate type color imaging element, and is also referred to as a synchronization process. For example, in the case of an imaging element including color filters for three colors including RGB, the demosaic processing is a process of calculating color information of all of RGB for each pixel from a mosaic image consisting of RGB. Further, the RGB/YC conversion process is a process of generating luminance data Y and color difference data Cb and Cr from RGB image data subjected to demosaic processing.

The imaging control unit 42 is a unit that instructs discharge of charge accumulated in a capacitor of each pixel of the imaging element 24 via the CMOS driver 28 and the TG 29 or reading of a signal corresponding to the charge accumulated in the capacitor, and performs imaging control of a still image or a moving image.

The lens control unit 43 is a unit that controls the focus lens, the variable magnification lens, and the diaphragm 23 included in the imaging lens 22 via the lens driving unit 26, and performs, for example, autofocus (AF) control to move the focus lens to a focusing position. The AF control is performed by integrating an absolute value of a high-frequency component of the digital signal corresponding to the AF area, detecting the focusing position at which the integrated value (AF evaluation value) is maximized, and moving the focus lens to the detected focusing position.

The pan and tilt control unit 44 is a unit that controls the pan and tilt device 30, and outputs a motor driving command input from the smartphone 100 via the wireless communication unit 50 and the camera work control unit 46 (motor driving command input unit), to the pan driving unit 34 and the tilt driving unit 36 of the pan and tilt mechanism 32.

The posture sensor 45 is a sensor that detects an installation posture of the pan and tilt camera 10. A gyro sensor can be used as the posture sensor 45. In this example, the posture sensor 45 detects any one of a posture when the pan and tilt camera 10 is installed on an upper surface of a horizontal plane, a posture when the pan and tilt camera 10 is installed on a lower surface of the horizontal plane, and a posture when the pan and tilt camera 10 is installed on a vertical plane. A posture when the pan and tilt camera 10 is installed on the upper surface of the horizontal plane corresponds to, for example, a posture when the pan and tilt camera is placed on a desk or the pan and tilt camera is attached to a tripod, and a posture when the pan and tilt camera 10 is installed on the vertical plane corresponds to, for example, a posture when the pan and tilt camera is installed on a wall. Posture information indicating the installation posture detected by the posture sensor 45 can be transmitted to the smartphone 100 via the wireless communication unit 50.

The camera work control unit 46 outputs a command signal for controlling the lens control unit 43 and the pan and tilt control unit 44 in order to realize imaging of a desired still image or moving image.

The angle detection unit 48 is a unit that detects each of the pan angle and the tilt angle of the pan and tilt mechanism 32, and includes a first counter that up and down counts the number of pulse signals for driving the pan motor of the pan driving unit 34, and a second counter that up and down counts the number of pulse signals for driving the tilt motor of the tilt driving unit 36. In the first counter and the second counter, the count value is reset to zero or a defined value is preset by a detection signal of a home position sensor that detects a reference position in the pan direction provided in the pan and tilt mechanism 32 and a detection signal of a home position sensor that detects a reference position in the tilt direction. Accordingly, the count value of the first counter and the count value of the second counter after the count value is reset or preset correspond to the pan angle (pan position) and the tilt angle (tilt position) of the pan and tilt mechanism 32, respectively.

The wireless communication unit 50 (an information output unit or a live view image output unit) is a unit that performs wireless communication with an external portable terminal such as the smartphone 100 illustrated in FIG. 1. The wireless communication unit 50 constitutes a wireless local area network (LAN) with an access point (for example, the smartphone 100 or a router), receives various instruction inputs for operations from the smartphone 100 through wireless communication, and transmits posture information indicating the installation posture detected by the posture sensor 45 and angle information indicating a pan angle and a tilt angle detected by the angle detection unit 48 to the smartphone 100. Further, the wireless communication unit 50 can transmit a moving image (live view image) captured by the imaging unit 20 and processed by the signal processing unit 41 to the smartphone 100, and transmit a still image or a moving image for recording captured by the imaging unit 20 to the smartphone 100. Thus, it is possible to record an image for recording in an internal recording medium of the smartphone 100 or an external recording medium (recording unit) or display the live view image in the display area for a live view image of the display panel 121 of the smartphone 100. In a case where the installation posture of the pan and tilt camera 10 is the reference installation posture (in this example, a posture when the pan and tilt camera 10 is installed on an upper surface of a horizontal plane), an erect live view image is output if the live view image output from the pan and tilt camera 10 is caused to be output as it is. Therefore, in a case where the pan and tilt camera 10 is installed on a lower surface of the horizontal plane, an inverted live view image is output if the live view image output from the pan and tilt camera 10 is caused to be output as it is.

The operation unit 60 includes, for example, an imaging start button 19 provided in the camera body 12 (FIG. 1) and a power button, and can perform an instruction input for the same operation as an instruction input for an operation from the smartphone 100.

The display unit 61 functions as an image display unit that displays a live view image, a played image, or the like, and functions as a user interface (UI unit) for displaying a menu screen and setting and inputting various parameters in cooperation with an operation unit 60.

The memory 62 includes a recording unit such as a synchronous dynamic random access memory (SDRAM) including a storage area that temporarily stores a captured still image or moving image, and a work area in which various calculation processes are performed, a read only memory (ROM) in which, for example, a program for imaging and various data necessary for control are stored, or a flash ROM that records the captured still image or moving image.

<Pan Tilt Operation Device>

Next, an embodiment of the pan and tilt operation device according to the present invention will be described.

In this example, a smartphone 100 in which pan and tilt operation program for causing a general-purpose smartphone to have various functions to be described below is installed functions as a pan and tilt operation device according to the present invention, as illustrated in FIG. 1.

Figure 3:
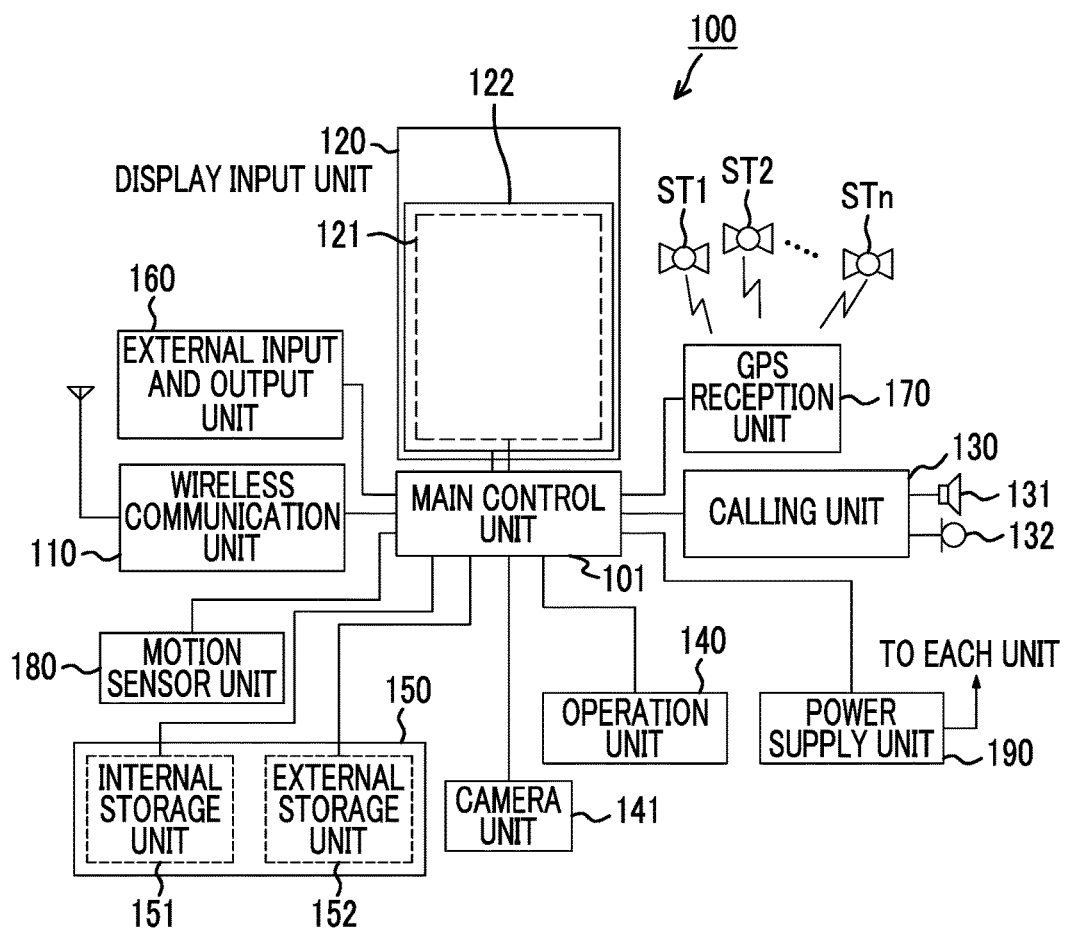
FIG. 3 is a block diagram illustrating a configuration of a smartphone illustrated in FIG. 1.

FIG. 3 is a block diagram illustrating a configuration of the smartphone 100 illustrated in FIG. 1.

As illustrated in FIG. 3, main components of the smartphone 100 include a wireless communication unit 110, a display input unit (touch panel) 120, a calling unit 130, an operation unit 140, a camera unit 141, a storage unit 150, an external input and output unit 160, a global positioning system (GPS) reception unit 170, a motion sensor unit 180, a power supply unit 190, and a main control unit 101. Further, a main function of the smartphone 100 includes a wireless communication function of performing mobile wireless communication with a base station device BS over a mobile communication network NW.

The wireless communication unit 110 performs wireless communication with the base station device BS accommodated in the mobile communication network NW according to an instruction of the main control unit 101. Using this wireless communication, the wireless communication unit 110 performs transmission and reception of various types of file data such as audio data and image data, e-mail data, or the like, or reception of web data, streaming data, or the like. In this example, the wireless communication unit 110 of the smartphone 100 constitutes a wireless LAN between a station (for example, a pan and tilt camera) and an access point (for example, a router), and transmits an instruction input for various operations to the pan and tilt camera 10 or receives a live view image, an image for recording, or the like from the pan and tilt camera 10.

The touch panel 120 is a touch panel that displays an image (a still image and a moving image), text information, or the like to visually deliver information to a user and detects a user operation for the displayed information under the main control unit 101. The touch panel 120 includes a display panel 121 and an operation panel 122. In a case where a 3D image is viewed, it is preferable for the display panel 121 to be a 3D display panel.

The display panel 121 uses a liquid crystal display (LCD), an organic electro-luminescence display (OELD), or the like as a display device.

The operation panel 122 is a device that is placed so that an image displayed on a display surface of the display panel 121 can be viewed, and detects one or a plurality of coordinates operated by a finger of a user or a stylus. If this device is operated by the finger of the user or the stylus, the operation panel 122 outputs a detection signal generated by the operation to the main control unit 101. Then, the main control unit 101 detects an operation position (coordinates) on the display panel 121 on the basis of the received detection signal.

The display panel 121 and the operation panel 122 of the smartphone 100 are formed integrally to constitute the touch panel 120 as illustrated in FIG. 1, but the operation panel 122 is arranged to completely cover the display panel 121. In a case where this arrangement is adopted, the operation panel 122 may have a function of detecting a user operation in a area outside the display panel 121. In other words, the operation panel 122 may include a detection area (hereinafter referred to as a display area) for an overlapping portion that overlaps the display panel 121, and a detection area (hereinafter referred to as a non-display area) for an outer edge portion that does not overlap the display panel 121, other than the display area.

A size of the display area and a size of the display panel 121 fully match, but it is not always necessary for both to match. Further, the operation panel 122 may include two sensitive areas including an outer edge portion and an inner portion other than the outer edge portion. Further, a width of the outer edge portion is appropriately designed according to, for example, a size of a housing 102. Further, a position detection scheme adopted in the operation panel 122 may include a matrix switch scheme, a resistance film type, a surface acoustic wave scheme, an infrared scheme, an electromagnetic induction scheme, an electrostatic capacitance scheme, and the like, and any of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the touch panel 120 is provided.

The operation unit 140 is a hardware key using a key switch or the like, and receives an instruction from the user. For example, the operation unit 140 is a push button switch that is mounted on a lower surface in a lower portion of a display portion of the housing 102 of the smartphone 100, and is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. The storage unit 150 includes an internal storage unit 151 built in the smartphone and an external storage unit 152 having a slot for a detachable external memory. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module card (SIM)/user identity module card (UIM) connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wireless connected PDA, and a wiredly/wireless connected earphone. The external input and output unit can transfer data received from such an external device to each component inside the smartphone 100, or send internal data of the smartphone 100 to the external device.

The GPS reception unit 170 receives GPS signals that are transmitted from GPS satellites ST1 to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a triaxial acceleration sensor, and detects a physical motion of the smartphone 100 according to an instruction of the main control unit 101. By detecting a physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function include an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying a video on the touch panel 120 on the basis of image data (data of a still image or a moving image) such as received data or downloaded streaming data. The image processing function refers to a function of the main control unit 101 decoding the image data, performing image processing on a result of the decoding, and displaying the image on the touch panel 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display area of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion (display area) that overlaps the display panel 121 or the outer edge portion (non-display area) that does not overlap the display panel 121, other than the overlapping portion, and controlling the sensitive area of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD).

Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101.

In the smartphone 100 illustrated in FIG. 1, the camera unit 141 is mounted on the same surface as the touch panel 120, but a mounting position of the camera unit 141 is not limited thereto and may be mounted on a back surface of the touch panel 120. Alternatively, a plurality of camera units 141 may be mounted. In a case where the plurality of camera units 141 are mounted, switching to the camera unit 141 provided for imaging may be performed and imaging may be performed using only such a camera unit 141, or imaging may be performed using the plurality of camera units 141 at the same time.

Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using a triaxial acceleration sensor, or in combination with the triaxial acceleration sensor. Of course, the image from the camera unit 141 can also be used within the application software.

In this embodiment, by downloading application software for operating the pan and tilt camera 10 (a pan and tilt operation program according to the present invention) over a network or the like, storing the application software in the storage unit 150, and operating the main control unit 101 according to the downloaded application software using the application processing function of the smartphone 100, the general-purpose smartphone 100 functions as a pan and tilt operation device for operating the pan and tilt camera 10.

[Operation and Installation Posture of Pan and Tilt Camera 10]

Figure 4A:
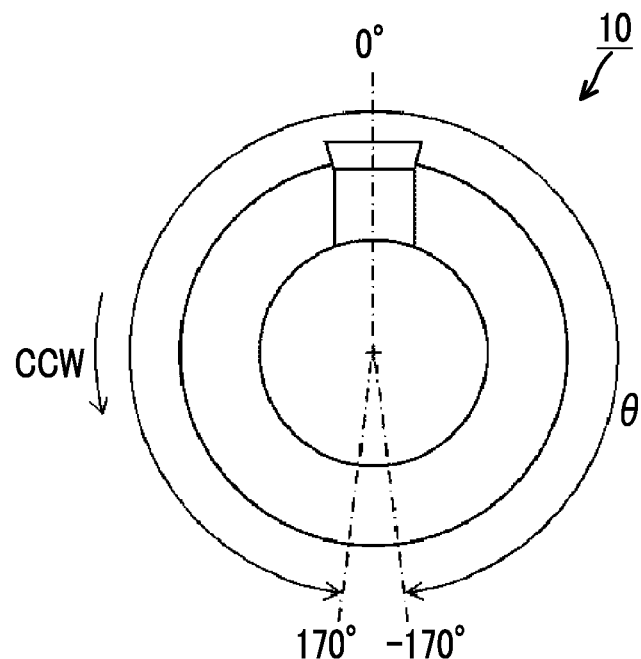
FIGS. 4A and 4B are diagrams illustrating an operation range of a pan operation and a tilt operation of the pan and tilt camera.
Figure 4B:
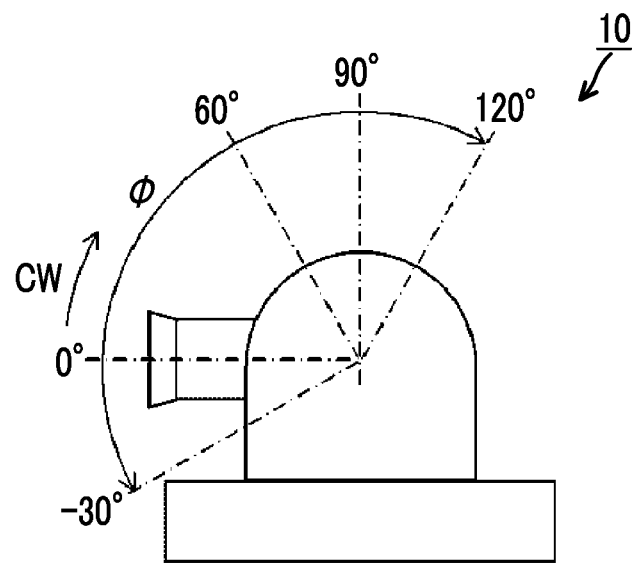

FIGS. 4A and 4B are diagrams illustrating an operation range of the pan operation and the tilt operation of the pan and tilt camera 10, FIG. 4A is a plan view of the pan and tilt camera, and FIG. 4B is a side view of the pan and tilt camera 10.

As illustrated in FIG. 4A, in the pan operation of the pan and tilt mechanism 32, a counter-clockwise direction (CCW direction) is a forward rotation direction in FIG. 4A, and a range of the pan angle $\theta$ in which the pan and tilt mechanism 32 is operable is 340° from −170° to 170°.

Further, as illustrated in FIG. 4B, in the tilt operation of the pan and tilt mechanism 32, a clockwise direction (CW direction) is a forward rotation direction in FIG. 4B, and a range of the tilt angle $\phi$ in which the pan and tilt mechanism 32 is operable is 150° from −30° to 120°.

If the pan and tilt camera 10 is powered ON, the pan and tilt camera 10 moves to an initial pan position at which the pan angle $\theta$ is 0° and an initial tilt position at which the tilt angle $\phi$ is 0° and waits for.

Figure 5A:
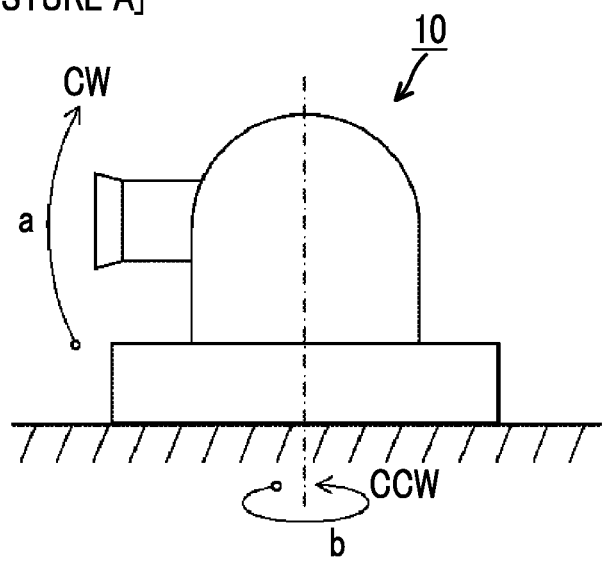
FIGS. 5A and 5B are diagrams illustrating an arrangement posture of the pan and tilt camera in a case where the pan and tilt camera is installed on an upper surface of a horizontal plane, and movement directions of an angle of view of a video to be captured in a case where the pan and tilt mechanism is caused to perform a pan operation in a counterclockwise direction (CCW direction) and the pan and tilt mechanism 32 is caused to perform a tilt operation in a clockwise direction (CW direction).
Figure 5B:
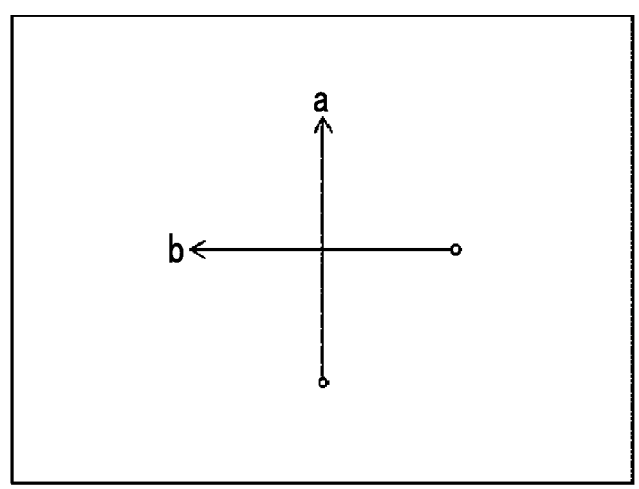

FIG. 5A is a diagram illustrating an arrangement posture (hereinafter referred to as "posture A") of the pan and tilt camera 10 in a case where the pan and tilt camera 10 is installed on an upper surface of a horizontal plane (including a case where the pan and tilt camera 10 is simply placed on a desk), and FIG. 5B is a diagram illustrating movement directions a and b of an angle of view of a video (live view image) to be captured in a case where the pan and tilt mechanism 32 is caused to perform a pan operation in the CCW direction (forward rotation direction) and the pan and tilt mechanism 32 is caused to perform a tilt operation in the CW direction (forward rotation direction) when the pan and tilt camera 10 takes the posture A.

In a case where the pan and tilt mechanism 32 is caused to perform a pan operation and a tilt operation in the forward rotation direction when the pan and tilt camera 10 takes posture A as illustrated in FIG. 5A, a movement direction b in the pan direction and a movement direction a in the tilt direction of the imaging unit also correspond to the forward rotation direction, and a movement direction b in the pan direction and a movement direction a in the tilt direction of an angle of view of the video to be captured also correspond to the forward rotation direction, as illustrated in FIG. 5B.

Figure 6A:
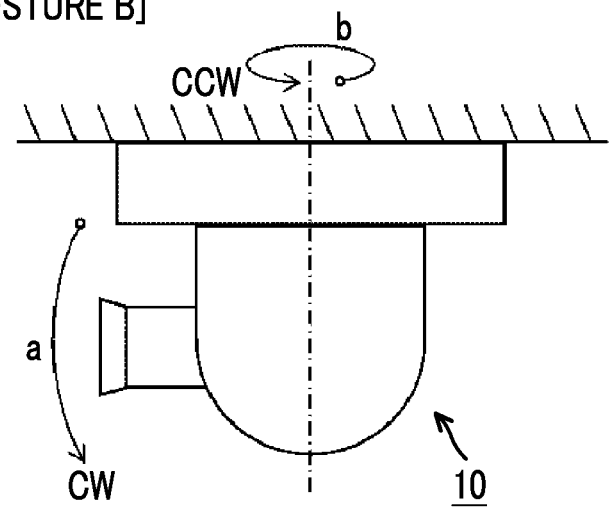
FIGS. 6A and 6B are diagrams illustrating an arrangement posture of the pan and tilt camera in a case where the pan and tilt camera is installed on a lower surface of a horizontal plane, and movement directions of an angle of view of a video to be captured in a case where the pan and tilt mechanism is caused to perform a pan operation in the CCW direction and the pan and tilt mechanism is caused to perform a tilt operation in the CW direction.
Figure 6B:
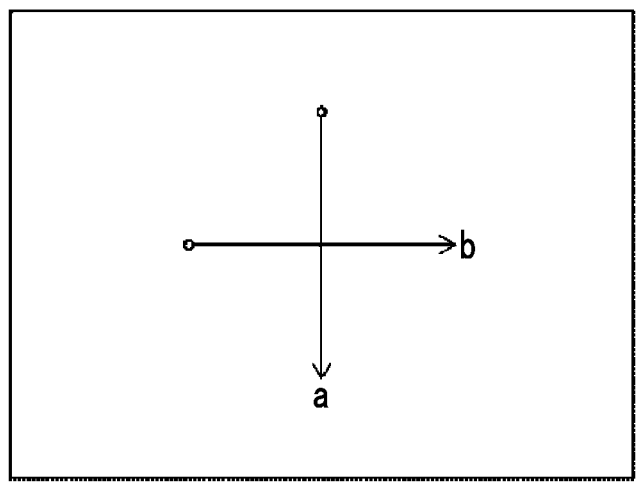

FIG. 6A is a diagram illustrating an arrangement posture (hereinafter referred to as "posture B") of the pan and tilt camera 10 in a case where the pan and tilt camera 10 is installed on a lower surface of a horizontal plane (including a case where the pan and tilt camera 10 is installed on a ceiling), and FIG. 6B is a diagram illustrating movement directions a and b of an angle of view of a video to be captured in a case where the pan and tilt mechanism 32 is caused to perform a pan operation in the CCW direction (forward rotation direction) and the pan and tilt mechanism 32 is caused to perform a tilt operation in the CW direction (forward rotation direction) when the pan and tilt camera 10 takes posture B.

In a case where the pan and tilt mechanism 32 is caused to perform the pan operation and the tilt operation in the forward rotation direction when the pan and tilt camera 10 takes posture B as illustrated in FIG. 6A, a movement direction b in the pan direction and a movement direction a in the tilt direction of the angle of view of the video to be captured are opposite to a movement direction when the pan and tilt camera 10 takes posture A, as illustrated in FIG. 6B (see FIG. 5B).

Figure 7A:
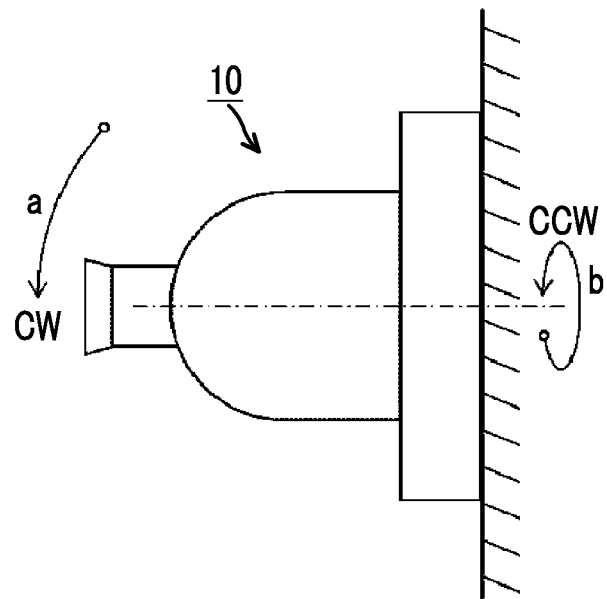
FIGS. 7A and 7B are diagram illustrating an arrangement posture of the pan and tilt camera in a case in which the pan and tilt camera is installed in a vertical plane and movement directions of an angle of view of a video to be captured in a case where the pan and tilt mechanism is caused to perform a pan operation in a CCW direction and the pan and tilt mechanism is caused to perform a tilt operation in a CW direction.

FIG. 7A is a diagram illustrating an arrangement posture (hereinafter referred to as "posture C") of the pan and tilt camera 10 in a case in which the pan and tilt camera 10 is installed in a vertical plane (in a case where the pan and tilt camera 10 is installed on a wall surface or the like), and particularly a case where the tilt angle φ of the pan and tilt mechanism 32 is 90° (see FIG. 4B). Further, FIG. 7B is a diagram illustrating movement directions a and b of an angle of view of a video to be captured in a case where the pan and tilt mechanism 32 is caused to perform a pan operation in a CCW direction (forward rotation direction) and the pan and tilt mechanism 32 is caused to perform a tilt operation in a CW direction (forward rotation direction when the pan and tilt camera 10 takes posture C.

Figure 7B:
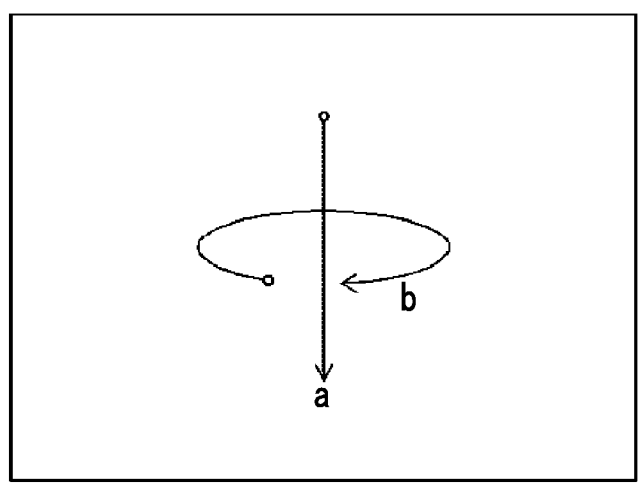

In a case where the pan and tilt mechanism 32 is caused to perform the pan operation in the forward rotation direction when the pan and tilt camera 10 takes posture C as illustrated in FIG. 7A, the angle of view of the video to be captured is rotated (rolled) in the CW direction instead of moving in the pan direction, as illustrated in FIG. 7B.

[Smartphone Display Screen]

Figure 8A:
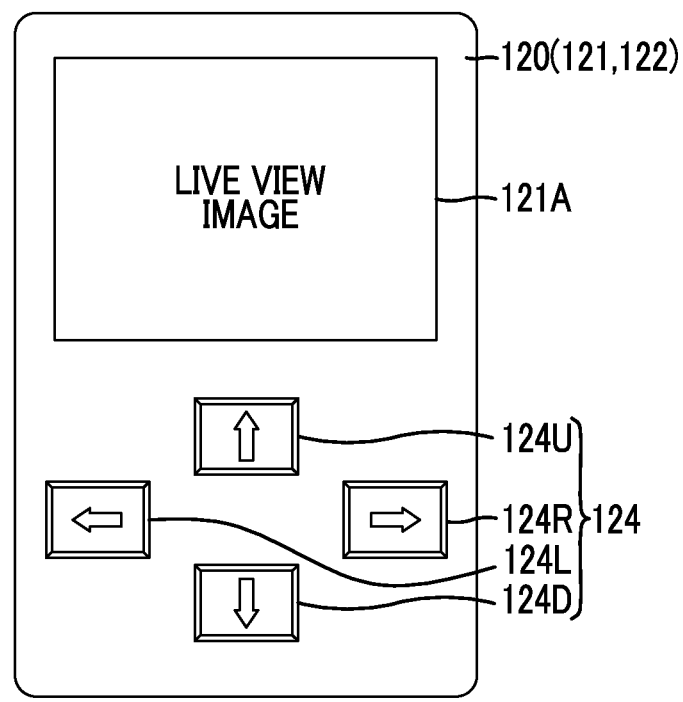
FIGS. 8A and 8B are diagrams illustrating an embodiment of a display screen of a smartphone.
Figure 8B:
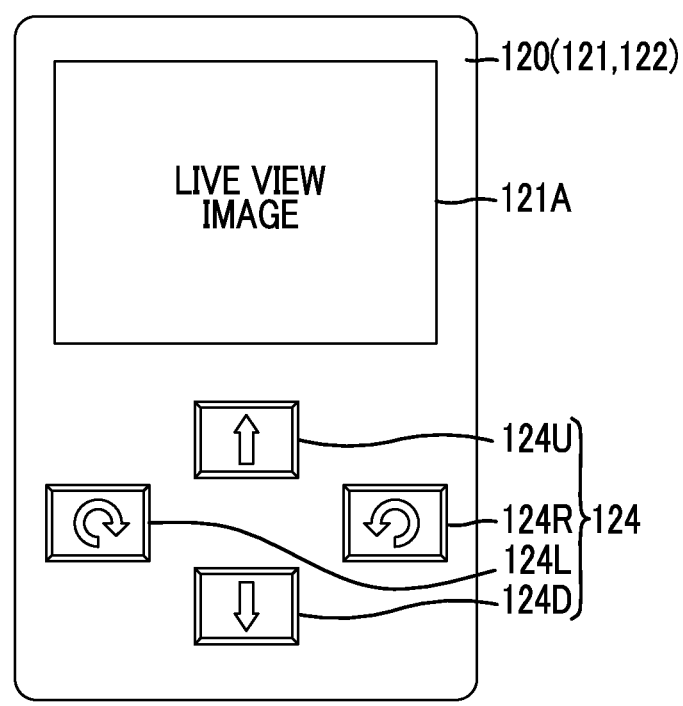

FIGS. 8A and 8B are diagrams illustrating an embodiment of a display screen of the smartphone 100. Particularly, FIG. 8A illustrates a display screen in a case where installation postures of the pan and tilt camera 10 are postures A and B, and FIG. 8B illustrates a display screen in a case where the installation posture of the pan and tilt camera 10 is posture C.

The smartphone 100 includes the touch panel 120 including the display panel 121 and the operation panel 122 (see FIG. 3), and a panel surface of the display panel 121 is a display screen.

As illustrated in FIGS. 8A and 8B, a display area 121A for displaying a live view image is provided in the display panel 121, and the main control unit 101 (display control unit) displays a live view image received via the wireless communication unit 110 (live view image acquisition unit) from the pan and tilt camera 10 in the display area 121A of the display panel 121. In this case, the main control unit 101 displays the live view image so that the live view image is erect in the display area 121A on the basis of the posture information indicating an installation posture of the pan and tilt camera 10 received from the pan and tilt camera 10 via the wireless communication unit 50 (posture information acquisition unit). For example, the main control unit 101 directly outputs the received live view image in a case where the installation posture of the pan and tilt camera 10 is posture A, rotates the received live view image by 180° and displays the live view image in a case where the installation posture of the pan and tilt camera 10 is posture B, and rotates the received live view image by 90° and displays the live view image in a case where the installation posture of the pan and tilt camera 10 is posture C. The main control unit 101 may receive a rotation instruction for the live view image from the touch panel 120 or the operation unit 140 and rotate the live view image according to the received rotation instruction.

Further, the main control unit 101 (display control unit) displays a cross key 124 including icons indicating an up key 124U, a down key 124D, a left key 124L, and a right key 124R on the display panel 121, as illustrated in FIGS. 8A and 8B.

The icons indicating the up key 124U and the down key 124D illustrated in FIG. 8A are icons (first icon) indicating the tilt direction using an arrow, and the icons indicating the left key 124L and the right key 124R are icons (first icon) indicating the tilt direction using an arrow.

The icons indicating the up key 124U and the down key 124D illustrated in FIG. 8B are icons (first icon) indicating the tilt direction using an arrow, and the icons indicating the left key 124L and the right key 124R are icons (second icon) indicating a rotation (rolling) direction using an arrow.

That is, the main control unit 101 displays the first icon indicating the tilt direction using an arrow as the icons indicating the left key 124L and the right key 124R in a case where the installation postures of the pan and tilt camera 10 are postures A and B, and displays the second icon indicating the rotation direction (rolling) using an arrow as the icons indicating the left key 124L and the right key 124R in a case where the installation posture of the pan and tilt camera 10 is posture C.

Further, the main control unit 101 functions as a key operation detection unit that detects which of the up key 124U, the down key 124D, the left key 124L, and the right key 124R of the cross key 124 is touched on the basis of touched coordinates on the display panel 121 which is detected by the operation panel 122. The main control unit 101 recognizes respective display areas of the icons corresponding to the up key 124U, the down key 124D, the left key 124L, and the right key 124R of the cross key 124 displayed on the display panel 121 and detects the touched key according to the display area to which coordinates detected by the operation panel 122 belong.

Further, the main control unit 101 functions as a motor control assignment setting unit and a motor driving command output unit shown below.

That is, the main control unit 101 functioning as the motor control assignment setting unit sets motor control assignment indicating a correspondence relationship between a touch operation of the up key 124U, the down key 124D, the left key 124L, or the right key 124R of the cross key 124, and assignment of the pan motor or the tilt motor driving the pan and tilt mechanism 32 and motor rotation direction (forward rotation direction or reverse rotation direction) on the basis of the posture information indicating the installation posture of the pan and tilt camera 10 received via the wireless communication unit 50 (posture information acquisition unit or angle acquisition unit) from the pan and tilt camera 10, and the pan angle and the tilt angle of the pan and tilt mechanism 32.

Further, if the up key 124U, the down key 124D, the left key 124L, or the right key 124R of the cross key 124 is touched, the main control unit 101 functioning as the motor driving command output unit selects the pan motor or the tilt motor of the pan and tilt mechanism 32 and outputs a motor driving command obtained by specifying a rotation direction of the selected motor according to the motor control assignment set for up, down, left and right keys of the cross key 124.

FIG. 9 illustrates a table showing a relationship among the installation posture (postures A, B, and C illustrated in FIGS.

5 to 7) of the pan and tilt camera 10, the display form of the icons indicating the up, down, left, and right keys of the cross key 124, and the motor control assignment of the respective up, down, left and right keys of the cross key 124.

Although the display form of the icon indicating the respective up, down, left, and right keys of the cross key 124 is basically an icon (first icon) indicting a pan direction and a tilt direction using an arrow, the first icon indicating the left key and the right key is switched to a second icon indicating the rotation direction using an arrow under a specific condition (in this example, posture C) in which a video captured by the pan and tilt camera 10 rotates if the pan motor is driven (see FIGS. 8A and 8B).

Accordingly, when the left key or the right key is operated under a specific condition under which a video rotates, it is possible not to cause discomfort even when the video rotates.

Further, when the installation postures of the pan and tilt camera 10 are postures A and B, each of the up key and the down key is assigned for control of the tilt motor, and each of the left key and the right key is assigned for control of the pan motor, but in posture A and posture B, motor control is assigned so that a motor rotation direction (CW direction and CCW direction) is reversed.

Thus, in a case where the respective up, down, left, and right keys of the cross key 124 are touched, a movement direction of an angle of view of the video to be captured can be set to the direction indicated by the respective up, down, left, and right keys regardless of whether the installation posture of the pan and tilt camera 10 being posture A or posture B, and no discomfort can be caused in a touch operation of the respective up, down, left, and right keys of the cross key 124.

FIGS. 10A1 to 10B3 are diagrams illustrating that a movement direction (including rotation) of the angle of view for imaging is changed according to a range of a tilt angle φ of the pan and tilt mechanism 32 when the installation posture of the pan and tilt camera 10 is posture A.

FIG. 10A1 illustrates a state in which the tilt angle φ of the pan and tilt mechanism 32 is 0°, and FIG. 10B1 is a diagram illustrating the movement directions a and b of the angle of view of the video to be captured in a case where the pan and tilt mechanism 32 is caused to perform a pan operation in a CCW direction (forward rotation direction) from the state illustrated in FIG. 10A1 and the pan and tilt mechanism 32 is caused to perform a tilt operation in a CW direction (forward rotation direction).

FIG. 10A2 illustrates a state in which the tilt angle φ of the pan and tilt mechanism 32 is 90°, and FIG. 10B2 is a diagram illustrating the movement directions a and b of the angle of view of the video to be captured in a case where the pan and tilt mechanism 32 is caused to perform a pan operation in a CCW direction from the state illustrated in FIG. 10A2 and the pan and tilt mechanism 32 is caused to perform a tilt operation in a CW direction.

FIG. 10A3 illustrates a state in which the tilt angle φ of the pan and tilt mechanism 32 is 180°, and FIG. 10B3 is a diagram illustrating the movement directions a and b of the angle of view of the video to be captured in a case where the pan and tilt mechanism 32 is caused to perform a pan operation in a CCW direction from the state illustrated in FIG. 10A3 and the pan and tilt mechanism 32 is caused to perform a tilt operation in a CW direction. As illustrated in FIG. 4B, a range of the tilt angle φ of the pan and tilt mechanism 32 in this example is from −30° to 120°, but in the example illustrated in FIG. 10A3, a case where the tilt angle φ is rotatable up to 180° is illustrated.

If the tilt angle φ of the pan and tilt mechanism 32 is different as illustrated in FIGS. 10A1, 10A2, and 10A3, in a case where the pan and tilt mechanism 32 is caused to perform the pan operation in the CCW direction and the pan and tilt mechanism 32 is caused to perform a tilt operation in the CW direction, the movement directions a and b of the angle of view of the video to be captured is different as illustrated in FIGS. 10B1, 10B2, and 10B3. In particular, if the tilt angle φ of the pan and tilt mechanism 32 is 90°, the angle of view of the video to be captured does not move in the pan direction and rotates (rolls) as illustrated in FIG. 10B2.

Accordingly, the main control unit 101 sets motor control assignment indicating a correspondence relationship between a touch operation of each of the respective up, down, left and right keys of the cross key 124, and assignment of the pan motor or the tilt motor for driving the pan and tilt mechanism 32 and the motor rotation direction according to the current tilt angle of the pan and tilt mechanism 32, in addition to the installation posture of the pan and tilt camera 10, selects the pan motor or the tilt motor of the pan and tilt mechanism 32 according to the set motor control assignment, and outputs a motor driving command obtained by specifying the rotation direction of the selected motor.

FIG. 11 illustrates a table showing a relationship among the range of the tilt angle when the installation posture of the pan and tilt camera 10 is posture A, the display form of the icons indicating the up, down, left, and right keys of the cross key 124, and the motor control assignment of the respective up, down, left and right keys of the cross key 124.

As illustrated in FIG. 11, when the range of the tilt angle φ, is from −30° to 90° and from 90° to 180°, the motor control assignment is set so that the directions of rotation of the tilt motor assigned to the up key and the down key of the cross key 124 are different.

Further, when the range of the tilt angle φ is from 60° to 120°, a display form of the icons indicated by the left key and the right key of the cross key 124 is switched from the first icon indicating the pan direction using an arrow to the second icon indicating the rotation direction using an arrow.

In this example, for the range of the tilt angle switched to the second icon (that is, a specific conditions under which the video captured by the pan and tilt camera 10 rotates when the pan motor is driven), the tilt angle φ is 60° to 120°, but the present invention is not limited thereto and it is preferable for a user to be able to set an arbitrary angle range with the tilt angle φ of 90° as a center angle.

Figure 12A:
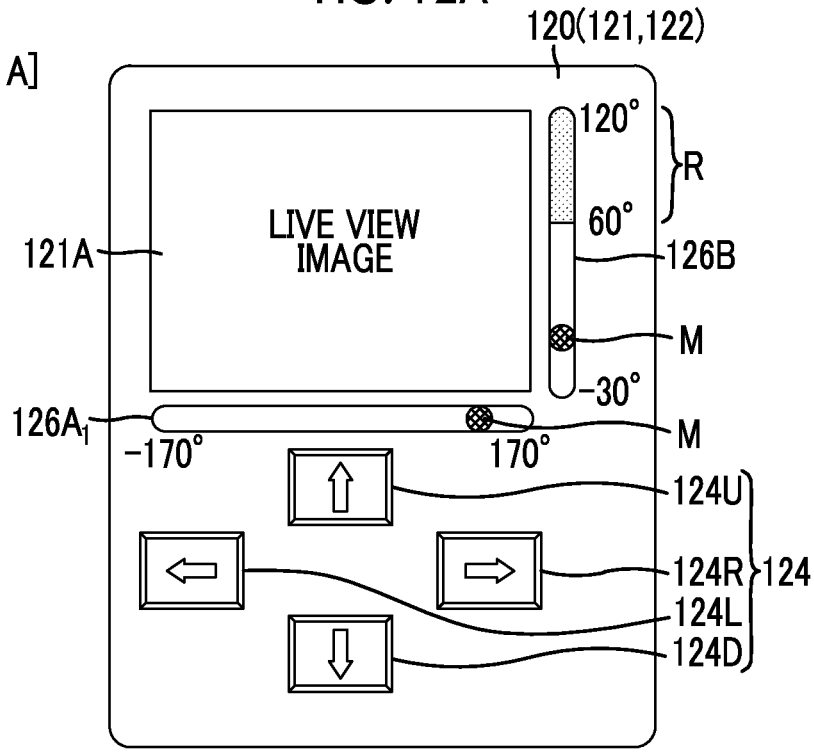
FIGS. 12A and 12B are diagrams illustrating another embodiment of the display screen of the smartphone.
Figure 12B:
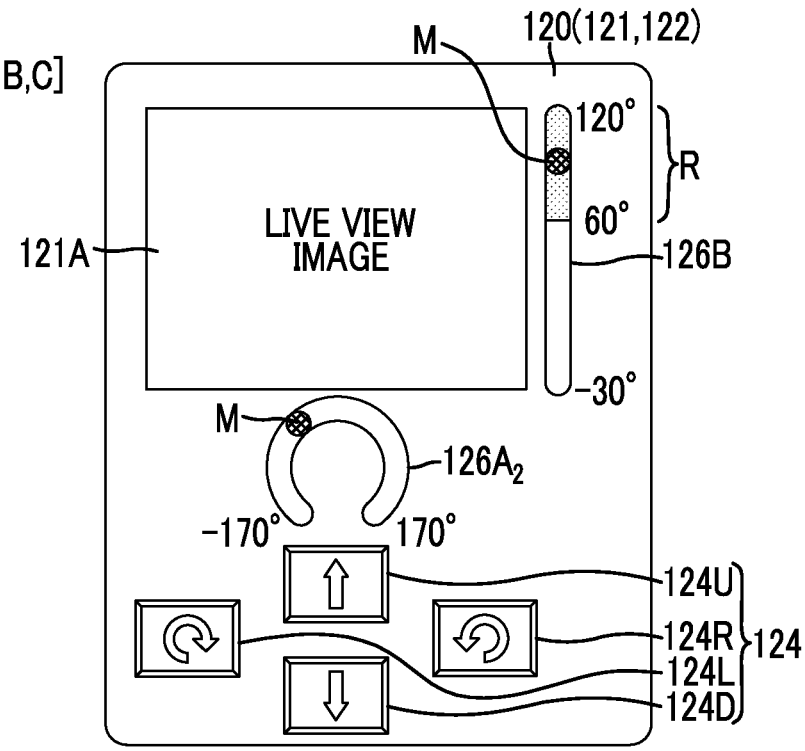

FIGS. 12A and 12B are diagrams illustrating another embodiment of the display screen of the smartphone 100. FIG. 12A illustrates a display screen in a case where installation postures of the pan and tilt camera 10 are postures A and B, and FIG. 12B illustrates a display screen in a case where the installation posture of the pan and tilt camera 10 is posture C.

Since the embodiment illustrated in FIGS. 12A and 12B are different from the embodiment illustrated in FIGS. 8A and 8B in that a current pan angle and a current tilt angle of the pan and tilt mechanism are graphically displayed, a difference will be hereinafter described.

A pan angle display portion 126A$_1$ (126A$_2$) and a tilt angle display portion 126B for graphically displaying a current pan angle and a current tilt angle of the pan and tilt mechanism 32 are provided on the lower side and the left side of a display area 121A for displaying a live view image on the display panel 121 of the smartphone 100 as illustrated in FIGS. 12A and 12B.

The pan angle display portion 126A₁ (126A₂) is a portion for graphically displaying the current pan angle. A range (−170° to 170°) of the pan angle θ is displayed using a length of a bar or a length of an arc, and the current pan angle is displayed by a marker on the bar or the arc M.

It can be confirmed that a video captured by the pan and tilt camera 10 rotates if the pan motor is driven by switching the display form of the range of the pan angle θ from the bar to the arc.

On the other hand, the tilt angle display portion 126B is a portion for graphically displays the current tilt angle. A range (−30° to 120°) of the tilt angle ϕ is displayed by a length of a bar, and the current tilt angle is displayed by a marker M on the bar.

In the tilt angle display portion 126B, a range (from 60° to 120°) of the tilt angle at which a video captured by the pan and tilt camera 10 rotates is displayed so that the range is identifiable from the other angle range if the pan motor is driven. Accordingly, it can be visually (intuitively) confirmed whether the current tilt angle satisfies specific conditions in which an video rotates due to driving of the pan motor.

Figure 13A:
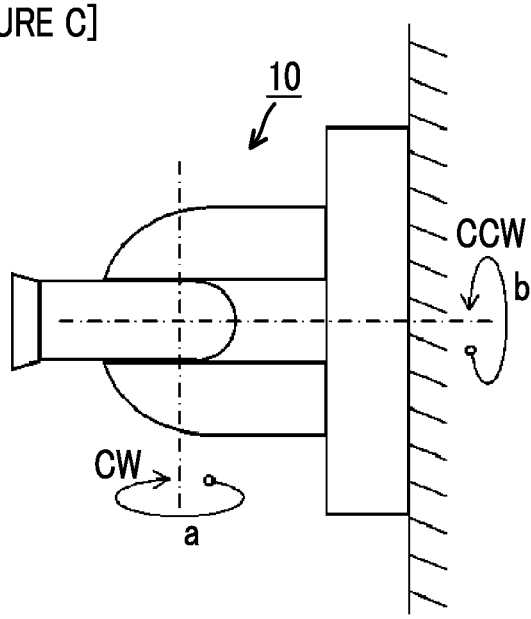
FIGS. 13A and 13B are diagram illustrating a posture of the pan and tilt camera in a case where the pan and tilt camera is installed on a vertical plane and a rotation center of a tilt driving unit is made vertical, and movement directions of an angle of view of a video to be captured in a case where the pan and tilt mechanism is caused to perform a pan operation in a CCW direction and the pan and tilt mechanism is caused to perform a tilt operation in a CW direction.

FIG. 13A illustrates a case where the installation posture of the pan and tilt camera 10 is posture C (the pan and tilt camera 10 is installed on a vertical plane), and particularly, a case where a rotation center of the tilt driving unit 36 is made vertical by the pan angle when pan driving is performed.

Figure 13B:
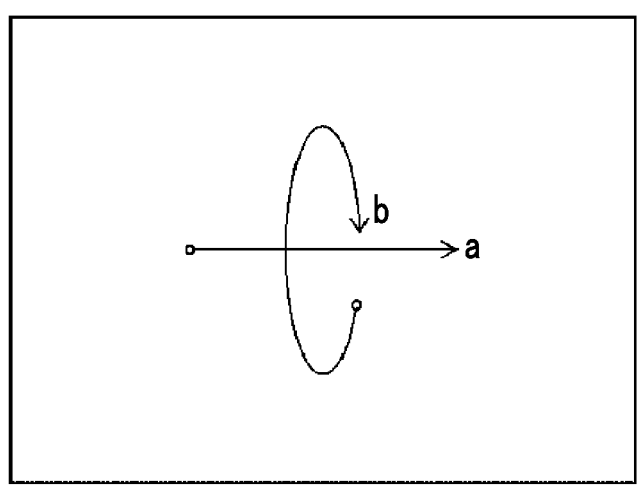

Further, FIG. 13B is a diagram illustrating movement directions a and b of the angle of view of the video to be captured in a case where the pan and tilt mechanism 32 is caused to perform a pan operation in a CCW direction (forward rotation direction) and the pan and tilt mechanism 32 is caused to perform a tilt operation in a CW direction (forward rotation direction) when the pan and tilt camera 10 is in posture C illustrated in FIG. 13A.

If the pan and tilt mechanism 32 is tilt-driven in a state illustrated in FIG. 13A, the movement direction a of the angle of view of the video to be captured becomes a horizontal direction, and if the pan and tilt mechanism 32 is pan-driven, the angle of view of the video to be captured rotates (FIG. 13B).

That is, it is necessary to set motor control assignment indicating a correspondence relationship between a touch operation of each of the respective up, down, left and right keys of the cross key 124, and assignment of the pan motor or the tilt motor for driving the pan and tilt mechanism 32 and the motor rotation direction according to the current pan angle, in addition to the installation posture of the pan and tilt camera 10 and the current tilt angle of the pan and tilt mechanism 32.

In the case of the state illustrated in FIG. 13A, it is preferable for the display form of the icons indicating the up and down keys of the cross key 124 to be switched from an icon indicating an arrow in an up and down direction to an icon indicating an arrow in an left and right direction, and it is preferable for the display form of the icons indicating the left and right keys of the cross key 124 to be switched from an icon indicating an arrow in a left and right direction to an icon indicating a rotation direction using an arrow.

Further, in the state illustrated in FIG. 13A, for example, in a case where the tilt angle is changed from 90° to 0°, then, if the pan motor is driven, the angle of view of the video to be captured is moved in the up and down direction (vertical direction), and if the tilt motor is driven, the angle of view of the video to be captured is moved in the left and right direction (horizontal direction).

Therefore, in this case, it is preferable that the up and down keys of the cross key 124 are assigned for motor control of the pan motor and the left and right keys are assigned for motor control of the tilt motor.

[Pan and Tilt Operation Method]

Next, a pan and tilt operation method according to the present invention will be described with reference to a flowchart illustrated in FIG. 14.

In FIG. 14, first, a power switch provided in the operation unit 60 of the pan and tilt camera 10 is turned ON (step S10). If the power switch is turned ON and power is supplied to each unit of the camera, the pan and tilt mechanism 32 is moved to a preset initial position (step S12). Specifically, until the pan and tilt mechanism 32 reaches a reference position in the pan direction and a reference position in the tilt direction (until the home position sensor is turned ON), the pan and tilt mechanism 32 is pan-driven in the CW direction and tilt-driven in the CCW direction, and then, a driving pulse with a defined number of pulses is applied to the pan motor and the tilt motor to move the pan and tilt mechanism 32 to a preset initial position (a position in which the pan angle and the tilt angle are 0°).

If the pan and tilt mechanism 32 is moved to the initial position, the posture information indicating the installation posture of the pan and tilt camera 10 is transmitted to the smartphone 100 (step S14). Subsequently, a moving image is captured by the imaging unit 20, a live view image processed by the signal processing unit 41 is transmitted to the smartphone 100, and angle information indicating the current pan angle and the current tilt angle detected by the angle detection unit 48 is transmitted to the smartphone 100 (step S16).

Meanwhile, the smartphone 100 receives the posture information transmitted from the pan and tilt camera 10 (step S20), and receives the live view image transmitted from the pan and tilt camera 10 and the current pan angle and the current tilt angle (step S22). The main control unit 101 of the smartphone 100 directly displays the live view image in the display area 121A of the display panel 121 on the basis of the posture information received in step S20 so that the received live view image is displayed to erect in the display area 121A of the display panel 121, or appropriately rotates and displays the live view image.

Subsequently, the main control unit 101 of the smartphone 100 sets motor control assignment indicating a correspondence relationship between a touch operation of each of the respective up, down, left and right keys of the cross key 124, and assignment of the pan motor or the tilt motor for driving the pan and tilt mechanism 32 and the motor rotation direction on the basis of the received posture information of the pan and tilt camera 10 and the current pan angle and the current tilt angle of the pan and tilt mechanism 32 (step S24).

Further, the main control unit 101 of the smartphone 100 determines the display form of the icons indicating the respective up, down, left, and right keys of the cross key 124 on the basis of the received posture information of the pan and tilt camera 10 and the current pan angle and the current tilt angle of the pan and tilt mechanism 32, and displays the icons in the determined display form (step S26). The display form for the icons indicating the respective up, down, left, and right keys of the cross key 124 is, for example, an icon (first icon) indicating the pan direction and the tilt direction using an arrow, or an icon (second icon) indicating the rotation direction using an arrow in a case where the video rotates if the pan operation is performed, as illustrated in FIGS. 8A and 8B.

Thereafter, when the cross key 124 is touched (step S28), the main control unit 101 of the smartphone 100 transmits a motor driving command (a motor driving command in which the rotation direction is specified) for the motor assigned to the touched key to the pan and tilt camera 10 according to the motor control assignment set in step S24 (step S30).

If the pan and tilt camera 10 receives a command to drive the pan motor or the tilt motor from the smartphone 100, the pan and tilt camera 10 drives and controls the pan motor or the tilt motor on the basis of the received driving command, moves the pan and tilt mechanism 32, and detects the pan angle and the tilt angle of the pan and tilt mechanism 32 (step S18).

The pan and tilt camera 10 transitions to step S16 after performing the process of step S18, the smartphone 100 transitions to step S22 after performing the process in step S30, and the pan and tilt camera 10 and the smartphone 100 repeat the respective processes described above.

Accordingly, a photographer can perform pan and tilt operations of the pan and tilt mechanism 32 using the smartphone 100 so that the pan and tilt camera 10 can image a desired subject. In this case, it is possible not to cause discomfort between an instruction resulting from a touch operation of the cross key 124 and the video to be captured. In particular, in the case of a specific condition under which the video rotates, since the display of the icon of the corresponding key of the cross key 124 is switched to an icon indicating the rotation direction, it is possible not to cause discomfort even when the video rotates.

[Others]

In this embodiment, the posture information indicating the installation posture of the pan and tilt camera is acquired from the pan and tilt camera, the present invention is not limited thereto, and the posture information may be acquired on the basis of a manual operation using the touch panel 120 or the operation unit 140 (installation posture input unit) of the smartphone 100. For example, the posture information can be acquired through an operation of an icon or a button for selecting the installation posture of the pan and tilt camera. Further, when the pan and tilt camera moves to the initial position and waits for, it is possible to rotate the live view image so that the live view image erects while viewing the live view image displayed on the display panel and to acquire the posture information on the basis of the presence or absence of the rotation and the rotation angle at that case.

Further, the smartphone 100 may transmit an imaging command for a still image or a moving image through a switch operation of the operation unit 140 assigned to an icon button indicating an imaging button (not illustrated) or the imaging button or transmit a zoom instruction through a switch operation of the operation unit 140 assigned to an icon button indicating a zoom button (not illustrated) or a zoom button in a case where the imaging unit 20 is a zoom lens. Further, after a still image or a moving image has been captured in the pan and tilt camera 10, the captured still image or moving image may be received and the received still image or moving image may be stored in the external storage unit 152 or the like.

Further, the pan and tilt operation device according to the present invention is not limited to the smartphone in which the pan and tilt operation program is installed. A tablet terminal having a touch panel, or a personal digital assistant (PDA) may be applied as the pan and tilt operation device, or the pan and tilt operation device may be a dedicated pan and tilt operation device for operating the pan and tilt camera. Further, the pan and tilt operating unit and the pan and tilt camera are not limited to the wireless connection or may be connected using a cable.

Further, the icons indicating the respective up, down, left and right keys of the cross key are not limited to this embodiment and, for example, since the pan direction and the tilt direction can be visually recognized from an arrangement position of the respective up, down, left, and right keys, arrows, A, or the like may not be displayed. If at least the pan motor is driven and a specific condition under which the video to be captured rotates is discriminated, the corresponding icon among the icons indicating the up key, the down key, the left key, and the right key of the cross key may be switched to a icon indicating a rotation direction.

Further, in a case of a camera that cuts out and outputs a partial image from an image captured at a wide angle without using the pan and tilt mechanism, the camera being capable of electronic panning and tilting by moving a cut-out position of the image according to a pan instruction or a tilt instruction, a video is not rotated with a pan operation. Thus, in the case of pan and tilt operation device that operates such a camera, the display form of an icon indicating the respective up, down, left, and right keys of the cross key for performing panning and tilting instructions is different from the display form illustrated in FIGS. 9 and 11.

Further, the present invention is not limited to the above-described embodiments, and it is understood that various modifications can be made without departing from the spirit of the present invention.

EXPLANATION OF REFERENCES

10: pan and tilt camera
20: imaging unit
22: imaging lens
24: imaging element
30: pan and tilt device
32: pan and tilt mechanism
34: pan driving unit
36: tilt driving unit
40: control unit
41: signal processing unit
42: imaging control unit
43: lens control unit
44: pan and tilt control unit
46: camera work control unit
48: angle detection unit
50, 110: wireless communication unit
60, 140: operation unit
62: memory
100: smartphone
101: main control unit
120: display input unit (touch panel)
121: display panel
122: operation panel
$126A_1$, $126A_2$: pan angle display portion
126B: tilt angle display portion

What is claimed is:

1. A camera system including a camera and a pan and tilt operation device that is wirelessly or wiredly connected to the camera and remotely operates the camera, wherein the camera comprises an imaging unit including an imaging lens and an imaging element, a pan and tilt mechanism that rotates the imaging unit in a horizontal direction and a vertical direction with respect to a camera body, a pan driving unit and a tilt driving unit that drives the pan and tilt mechanism using a pan motor and a tilt motor, an angle detection unit that detects each of a pan angle and a tilt angle of the pan and tilt mechanism, a motor driving command input unit that receives a motor driving command for the pan motor and the tilt motor from the pan and tilt operation device, and a pan and tilt control unit that controls the pan and tilt mechanism via the pan driving unit and the tilt driving unit on the basis of the motor driving command input from the motor driving command input unit, the pan and tilt operation device comprises a posture information acquisition unit that acquires posture information indicating an installation posture of the camera, an angle acquisition unit that acquires angle information indicating a pan angle and a tilt angle of the camera, a touch panel including a display panel, and an operation panel that detects touched coordinates on the display panel, a display control unit that displays a cross key including icons indicating an up key, a down key, a left key, and a right key on the display panel, a key operation detection unit that detects whether any of the up key, the down key, the left key, and the right key of the cross key is touched on the basis of the coordinates detected by the operation panel, a motor control assignment setting unit that sets motor control assignment indicating a correspondence relationship between the touch operation of the up key, the down key, the left key, or the right key of the cross key detected by the key operation detection unit and assignment of the pan motor or the tilt motor that drives the pan and tilt mechanism and a motor rotation direction on the basis of the posture information acquired by the posture information acquisition unit, and a motor driving command output unit that outputs a motor driving command corresponding to the detected key to the camera when the touch operation of the up key, the down key, the left key, or the right key of the cross key is detected by the key operation detection unit, the motor driving command output unit outputting the motor driving command obtained by selecting the pan motor or the tilt motor according to the motor control assignment set by the motor control assignment setting unit and specifying the rotation direction of the selected motor, and the display control unit discriminates a specific condition under which a video captured by the camera rotates when the pan motor is driven, on the basis of the tilt angle acquired by the angle acquisition unit, and switches the corresponding icon among the icons indicating the up key, the down key, the left key, and the right key of the cross key displayed on the display panel from a first icon indicating an up and down direction or a left and right direction to a second icon indicating a rotation direction when the specific condition is discriminated; and wherein the camera includes a posture sensor that detects the installation posture of the camera;

an angle detection unit that detects each of the pan angle and the tilt angle of the pan and tilt mechanism; and an information output unit that outputs posture information indicating the installation posture detected by the posture sensor and angle information indicating the pan angle and the tilt angle detected by the angle detection unit to the pan and tilt operation device, wherein the posture information acquisition unit and the angle acquisition unit acquire the posture information and the angle information from the information output unit, respectively.

2. The camera system according to claim 1, wherein the camera includes a live view image output unit that outputs the live view image captured by the imaging unit to the pan and tilt operation device, the pan and tilt operation device includes an image acquisition unit that acquires the live view image captured by the camera from the camera, and the display control unit displays the live view image acquired by the image acquisition unit on the display panel.

3. The camera system according to claim 2, wherein the live view image output unit outputs a live view image in which the live view image is erect in a case where the installation posture of the camera is a reference installation posture, and the display control unit has a function of rotating and displaying the acquired live view image, and rotates the acquired live view image to erect the live view image to be displayed on the display panel in a case where the installation posture of the camera is different from the reference installation posture.

4. The camera system according to claim 1, wherein the pan and tilt operation device comprises an installation posture input unit in which the installation posture is set by a manual operation, and the posture information acquisition unit acquires posture information indicating the installation posture of the camera from the installation posture input unit.

5. The camera system according to claim 1, wherein the motor control assignment setting unit sets the motor control assignment on the basis of the posture information, and the pan angle and the tilt angle respectively acquired by the posture information acquisition unit and the angle acquisition unit.

6. The camera system according to claim 1, wherein at least one of the camera and the pan and tilt operation device comprises a recording unit that records the image captured by the imaging unit.

* * * * *